(12) United States Patent
Conklin

(10) Patent No.: US 9,991,980 B2
(45) Date of Patent: Jun. 5, 2018

(54) APPARATUS AND METHODS FOR TRACKING AND ANALYZING DIGITAL RECORDING DEVICE EVENT SEQUENCES

(75) Inventor: Charles Clinton Conklin, New Port Richey, FL (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 1361 days.

(21) Appl. No.: 12/144,915

(22) Filed: Jun. 24, 2008

(65) Prior Publication Data

US 2008/0253748 A1 Oct. 16, 2008

Related U.S. Application Data

(63) Continuation of application No. 11/138,576, filed on May 26, 2005, which is a continuation of application No. PCT/US02/38012, filed on Nov. 27, 2002.

(51) Int. Cl.
| | | |
|---|---|---|
| *H04N 5/76* | (2006.01) | |
| *H04H 60/33* | (2008.01) | |
| *H04N 5/781* | (2006.01) | |
| *H04N 5/85* | (2006.01) | |
| *H04N 5/907* | (2006.01) | |

(52) U.S. Cl.
CPC ............. *H04H 60/33* (2013.01); *H04N 5/76* (2013.01); *H04N 5/781* (2013.01); *H04N 5/85* (2013.01); *H04N 5/907* (2013.01)

(58) Field of Classification Search
CPC .................................................. H04N 21/442
See application file for complete search history.

(56) References Cited

U.S. PATENT DOCUMENTS

| | | |
|---|---|---|
| 4,361,832 A | 11/1982 | Cole |
| 4,367,525 A | 1/1983 | Brown et al. |
| 4,455,634 A | 6/1984 | Efron et al. |
| 4,566,030 A | 1/1986 | Nickerson et al. |
| 4,697,209 A | 9/1987 | Kiewit et al. |
| 4,792,864 A | 12/1988 | Watanabe et al. |
| 4,885,632 A | 12/1989 | Mabey et al. |

(Continued)

FOREIGN PATENT DOCUMENTS

| | | |
|---|---|---|
| CA | 2507317 | 6/2004 |
| EP | 1100265 | 5/2001 |

(Continued)

OTHER PUBLICATIONS

Canadian Intellectual Property Office, "Examination Report", Canadian patent application No. 2,507,317, dated Feb. 12, 2010, 3 pages.

(Continued)

*Primary Examiner* — Eileen M Adams
(74) *Attorney, Agent, or Firm* — Hanley, Flight & Zimmerman, LLC

(57) ABSTRACT

Methods and apparatus for tracking a sequence of events associated with a digital recording device are disclosed. An example method involves monitoring data conveyed via a data bus communicatively coupled to a processor and a data storage device associated with the digital media device. The example method also involves identifying event information associated with the digital media device based on the data and identifying the viewing information based on the event information.

36 Claims, 12 Drawing Sheets

(56) References Cited

U.S. PATENT DOCUMENTS

| | | |
|---|---|---|
| 5,034,902 A | 7/1991 | Steinmann |
| 5,165,069 A | 11/1992 | Vitt et al. |
| 5,319,453 A | 6/1994 | Copriviza et al. |
| 5,373,315 A | 12/1994 | Dufresne et al. |
| 5,425,100 A | 6/1995 | Thomas et al. |
| 5,436,653 A | 7/1995 | Ellis et al. |
| 5,438,355 A | 8/1995 | Palmer |
| 5,457,694 A | 10/1995 | Smith |
| 5,481,294 A | 1/1996 | Thomas et al. |
| 5,481,296 A | 1/1996 | Cragun et al. |
| 5,483,276 A | 1/1996 | Brooks et al. |
| 5,488,408 A | 1/1996 | Maduzia et al. |
| 5,488,409 A | 1/1996 | Yuen et al. |
| 5,532,732 A | 7/1996 | Yuen et al. |
| 5,579,124 A | 11/1996 | Aijala et al. |
| 5,608,866 A | 3/1997 | Horikawa |
| 5,646,675 A | 7/1997 | Copriviza et al. |
| 5,734,720 A | 3/1998 | Salganicoff |
| 5,844,478 A | 12/1998 | Blatter et al. |
| 5,848,046 A | 12/1998 | Sawada |
| 5,867,205 A | 2/1999 | Harrison |
| 5,872,588 A | 2/1999 | Aras et al. |
| 5,892,536 A | 4/1999 | Logan et al. |
| 5,986,692 A | 11/1999 | Logan et al. |
| 6,061,056 A | 5/2000 | Menard et al. |
| 6,184,918 B1 | 2/2001 | Goldschmidt Iki et al. |
| 6,202,103 B1 | 3/2001 | Vonbank et al. |
| 6,202,210 B1* | 3/2001 | Ludtke .................. 725/20 |
| 6,216,265 B1 | 4/2001 | Roop et al. |
| 6,233,389 B1 | 5/2001 | Barton et al. |
| 6,253,238 B1 | 6/2001 | Lauder et al. |
| 6,286,140 B1 | 9/2001 | Ivanyi |
| 6,405,275 B1 | 6/2002 | Morrow et al. |
| 6,457,010 B1 | 9/2002 | Eldering et al. |
| 6,460,018 B1 | 10/2002 | Kasai et al. |
| 6,513,161 B2 | 1/2003 | Wheeler et al. |
| 6,529,506 B1 | 3/2003 | Yamamoto et al. |
| 6,530,082 B1 | 3/2003 | Del Sesto et al. |
| 6,567,978 B1 | 5/2003 | Jarrell |
| 6,681,285 B1 | 1/2004 | Ng |
| 6,704,929 B1 | 3/2004 | Ozer et al. |
| 6,717,917 B1 | 4/2004 | Weissberger et al. |
| 6,725,342 B1 | 4/2004 | Coulson |
| 7,286,667 B1 | 10/2007 | Ryal |
| 7,363,647 B1* | 4/2008 | Fakharzadeh ............... 725/90 |
| 8,351,765 B2* | 1/2013 | Ismail et al. .............. 386/295 |
| 2001/0023436 A1 | 9/2001 | Srinivasan et al. |
| 2002/0007416 A1 | 1/2002 | Putzolu |
| 2002/0010919 A1 | 1/2002 | Lu et al. |
| 2002/0010921 A1 | 1/2002 | Kambayashi et al. |
| 2002/0056087 A1 | 5/2002 | Berezowski et al. |
| 2002/0056089 A1 | 5/2002 | Houston |
| 2002/0059576 A1 | 5/2002 | Feininger et al. |
| 2002/0059577 A1 | 5/2002 | Lu et al. |
| 2002/0059637 A1 | 5/2002 | Rakib |
| 2002/0059643 A1 | 5/2002 | Kitamura et al. |
| 2002/0069218 A1 | 6/2002 | Sull et al. |
| 2002/0078441 A1 | 6/2002 | Drake et al. |
| 2002/0124246 A1 | 9/2002 | Kaminsky et al. |
| 2002/0141730 A1 | 10/2002 | Haken |
| 2002/0154158 A1* | 10/2002 | Fukuda et al. ............. 345/723 |
| 2002/0162115 A1 | 10/2002 | Bruckner et al. |
| 2002/0173911 A1 | 11/2002 | Brunet et al. |
| 2002/0178277 A1 | 11/2002 | Laksono |
| 2003/0005432 A1 | 1/2003 | Ellis et al. |
| 2003/0037333 A1 | 2/2003 | Ghashghai et al. |
| 2003/0039464 A1 | 2/2003 | Davis et al. |
| 2003/0067554 A1 | 4/2003 | Klarfeld et al. |
| 2003/0072556 A1* | 4/2003 | Okujima et al. ............ 386/46 |
| 2003/0088871 A1* | 5/2003 | Kimura ................... 725/46 |
| 2003/0093790 A1 | 5/2003 | Logan et al. |
| 2003/0115587 A1 | 6/2003 | Kendall et al. |
| 2003/0170001 A1 | 9/2003 | Breen |
| 2003/0172376 A1 | 9/2003 | Coffin, III |
| 2003/0177488 A1 | 9/2003 | Smith et al. |
| 2003/0182567 A1 | 9/2003 | Barton et al. |
| 2003/0192060 A1 | 10/2003 | Levy |
| 2004/0010807 A1 | 1/2004 | Urdang et al. |
| 2004/0031045 A1 | 2/2004 | Ivanyi |
| 2004/0250281 A1 | 12/2004 | Feininger et al. |
| 2005/0054285 A1 | 3/2005 | Mears et al. |
| 2005/0076358 A1 | 4/2005 | Yamada |
| 2005/0138658 A1 | 6/2005 | Bryan |
| 2005/0138659 A1 | 6/2005 | Boccon-Gibod et al. |
| 2005/0193414 A1 | 9/2005 | Horvitz et al. |
| 2005/0232411 A1 | 10/2005 | Srinivasan et al. |
| 2006/0015902 A1 | 1/2006 | Matsuura et al. |
| 2006/0085812 A1 | 4/2006 | Shishegar et al. |
| 2006/0153296 A1 | 7/2006 | Deng |
| 2006/0184961 A1 | 8/2006 | Lee et al. |
| 2007/0006250 A1 | 1/2007 | Croy et al. |
| 2010/0247065 A1 | 9/2010 | Cooper et al. |

FOREIGN PATENT DOCUMENTS

| | | |
|---|---|---|
| WO | 9411989 | 5/1994 |
| WO | 9504430 | 2/1995 |
| WO | 9512278 | 5/1995 |
| WO | 9535606 | 12/1995 |
| WO | 9627840 | 9/1996 |
| WO | 9857267 | 12/1998 |
| WO | 99/63698 | 12/1999 |
| WO | 0011865 | 3/2000 |
| WO | 0058967 | 10/2000 |
| WO | 0062298 | 10/2000 |
| WO | 0122729 | 3/2001 |
| WO | 0161892 | 8/2001 |
| WO | 0176248 | 10/2001 |
| WO | 03032639 | 4/2003 |
| WO | 03049339 | 6/2003 |
| WO | 03052552 | 6/2003 |
| WO | 03060630 | 7/2003 |
| WO | 2004051997 | 6/2004 |
| WO | 2005036877 | 4/2005 |
| WO | 2005079457 | 9/2005 |
| WO | 2005079941 | 9/2005 |
| WO | 2005084186 | 9/2005 |
| WO | 2005107110 | 11/2005 |
| WO | 2005114450 | 12/2005 |
| WO | 2005124583 | 12/2005 |
| WO | 2005125198 | 12/2005 |
| WO | 2006012629 | 2/2006 |
| WO | 2006014495 | 2/2006 |
| WO | 2006020560 | 2/2006 |
| WO | 2006055897 | 5/2006 |

OTHER PUBLICATIONS

United States Patent and Trademark Office, "Election/Restrictions Requirement," issued in connection with U.S. Appl. No. 11/138,576, dated May 20, 2009 (8 pages).

United States Patent and Trademark Office, "Final Office Action," issued in connection with U.S. Appl. No. 11/618,442, dated Jul. 6, 2009 (14 pages).

United States Patent and Trademark Office, "Non-Final Office Action," issued in connection with U.S. Appl. No. 11/618,442, dated Jan. 21, 2009 (12 pages).

Patent Cooperation Treaty, "International Search Report," issued by the International Searching Authority in connection with PCT application No. PCT/US2002/038012, dated May 22, 2003 (4 pages).

Patent Cooperation Treaty, "Written Opinion," issued by the International Searching Authority in connection with PCT application No. PCT/US2002/038012, dated Sep. 2, 2004 (5 pages).

Patent Cooperation Treaty, "International Preliminary Examination Report," issued by the International Preliminary Examining Authority in connection with PCT application No. PCT/US2002/038012, dated Jun. 7, 2005 (8 pages).

Patent Cooperation Treaty, "International Search Report," issued by the International Searching Authority in connection with PCT application No. PCT/US2005/023995, dated Dec. 23, 2005 (1 page).

(56) References Cited

OTHER PUBLICATIONS

Patent Cooperation Treaty, "Written Opinion," issued by the International Searching Authority in connection with PCT application No. PCT/US2005/023995, dated Dec. 23, 2005 (3 pages).
Patent Cooperation Treaty, "International Preliminary Examination Report," issued by the International Preliminary Examining Authority in connection with PCT application No. PCT/US2005/023995, dated Jul. 28, 2006 (15 pages).
Schmidt, Friedhelm, "The SCSI Bus and IDS Interface; Protocols, Applications and Programming," pp. 38-40, 46-49, 62, and 68-71, $2^{nd}$ Edition, Published by Addison-Wesley Professional, on Jun. 17, 1999 (13 pages).
Supplementary European Search Report corresponding to Application No. 02784621.1, dated Jul. 29, 2009, (4 pages).
"Snoop Mechanism to Monitor Computer Bus," IBM Technical Disclosure Bulletin, IBM Corp., New York, vol. 32, No. 11, Apr. 1, 1990, pp. 170-171.
European Patent Office, "European Patent Office Exam Report," issued by the European Patent Office in connection with EP application No. 02 784 621.1-2202, dated Apr. 8, 2011 (6 pages).
United States Patent and Trademark Office, "Non-Final Office Action," issued in connection with U.S. Appl. No. 11/138,576, dated Jun. 23, 2011 (14 pages).
United States Patent and Trademark Office, "Non-Final Office Action," issued in connection with U.S. Appl. No. 11/138,576, dated Apr. 27, 2010 (9 pages).
United States Patent and Trademark Office, "Final Office Action," issued in connection with U.S. Appl. No. 11/138,576, dated Oct. 19, 2010 (13 pages).
United States Patent and Trademark Office, "Non-Final Office Action," issued in connection with U.S. Appl. No. 11/618,442, dated Dec. 24, 2009 (16 pages).
United States Patent and Trademark Office, "Final Office Action," issued in connection with U.S. Appl. No. 11/618,442, dated Jun. 8, 2010 (18 pages).
Australian Government, IP Australia, "Examiner's First Report," issued in Australian patent application No. 2005269957 dated Feb. 5, 2010 (2 pages).
I/ONE, IEEE 1394 Architecture, Dec. 15, 2003 (11 pages).
United States Patent and Trademark Office, "Notice of Allowance," issued in connection with U.S. Appl. No. 11/138,576, dated Jan. 9, 2012 (13 pages).
European Patent Office, "Extended European Search Report" issued in connection with European Application No. 13001703.1, dated Jul. 1, 2013, 15 pages.
European Patent Office, "Exam Report" issued in connection with European Application No. 02784621.1, dated Jul. 3, 2013, 6 pages.
European Patent Office, "Examination Report," issued in connection with European Application No. 13001703.1-1902, dated Feb. 24, 2014 (5 pages).
European Patent Office, "Examination Report," issued in connection with European Application No. 02784621.1-1902, dated Jan. 29, 2014 (5 pages).

* cited by examiner

APPARATUS AND METHODS FOR TRACKING AND ANALYZING DIGITAL RECORDING DEVICE EVENT SEQUENCES

RELATED APPLICATIONS

This patent is a continuation of U.S. patent application Ser. No. 11/138,576, filed May 26, 2005, which is a continuation of PCT/US02/38012, filed Nov. 27, 2002, both of which are hereby incorporated by reference herein in their entireties.

FIELD OF THE DISCLOSURE

The present disclosure relates generally to digital recording devices and, more particularly, to apparatus and methods for tracking and analyzing digital recording device event sequences.

BACKGROUND

Television ratings information is typically generated by collecting viewing records or other viewing information from a group of statistically selected households. Each of the statistically selected households typically has a data logging and processing unit commonly referred to as a "home unit." The home unit is often in communication with a variety of attachments that provide inputs to the home unit or receive outputs from the home unit. For example, a source identification unit such as a frequency detector attachment, which is a well-known device, may be in communication with a television to sense a local oscillator frequency of the television tuner. In this manner, the frequency detector attachment may be used to determine if the television is operating (i.e., is turned on) and to determine to which channel the television is currently tuned based on a detected frequency. A people counter, which is also a well-known device, may be located in the viewing space of the television and in communication with the home unit, thereby enabling the home unit to detect the identities of the persons currently viewing programs displayed on the television.

The home unit usually processes the inputs (e.g., channel tuning information, viewer identities, etc.) from the attachments to produce viewing records. Viewing records may be generated on a periodic basis (i.e., at fixed time intervals) or may be generated in response to a change in an input such as, for example, a change in the identities of the persons viewing the television, a change in the channel tuning information (i.e., a channel change), etc. In any case, each viewing record typically contains channel information such as a station or channel number and a time (e.g., a date and time of day) at which the channel was viewed. Of course, viewing records may contain other information such as the identities of viewers present at the viewing time.

Often, the home unit collects a quantity of viewing records and transmits collected viewing records, usually daily, to a central office or data processing facility for further processing or analysis. The central data processing facility receives viewing records from home units located in some or all of the statistically selected households and analyzes the viewing records to ascertain the viewing behaviors of a particular household or a particular group of households selected from all participating households. Additionally, the central data processing facility may generate viewing behavior statistics and other parameters indicative of viewing behavior associated with all of the participating households.

To generate viewing behavior information from viewing records, the central office or data processing facility compares reference data such as a list of programs (i.e., a schedule of television programming or television guide) to the viewing records. In this manner, the central office can infer which program was viewed by matching the time and channel information in a viewing record to the program associated with that same time and channel in the program schedule. Such a matching process can be carried out for each of the viewing records received by the central office, thereby enabling the central office to reconstruct what programs were watched by all participating households and the times at which the programs were watched.

While known apparatus and techniques for ascertaining the viewing behavior of a large population are well suited for viewing records associated with live viewing of television programming, these techniques are not suitable for use with audio and video programs that are recorded and then later viewed. In particular, for pre-recorded program information, the viewing time is delayed with respect to the time at which the program information was available as a live program. As a result, viewing records containing viewing time information cannot be compared to reference program guide information at the central office to infer what programs are associated with the viewing records. Further, the tuning information available from, for example, a frequency detector attachment in communication with a television that is being used to display a previously recorded program does not provide useful tuning information. More specifically, the recorded program is typically supplied by a video recorder (e.g., a VCR) or the like that sends unmodulated low-level video and audio signals to the video and audio inputs of the television that bypass the tuner circuitry of the television.

The use of digital video recorders (DVRs) and personal video recorders (PVRs) such as the TiVo™ system further complicates collection of viewing behavior information because viewers in households with these types of recording devices can rapidly change between live viewing of a program, a somewhat delayed viewing of a program, fast forwarding and rewinding a program, pausing a program, and recording a program for later viewing while watching another program live. The use of processing techniques based on recognition of program signatures has been employed in some cases where it is difficult to obtain accurate tuning information and in cases where it may otherwise be difficult to obtain viewing time information and channel information associated with the currently viewed program content. Unfortunately, these techniques are not well suited for use in situations where a recording device enables rapid changes between live viewing of a program, delayed viewing of the program, viewing of another program while recording the program, etc.

DESCRIPTION

Figure 1:
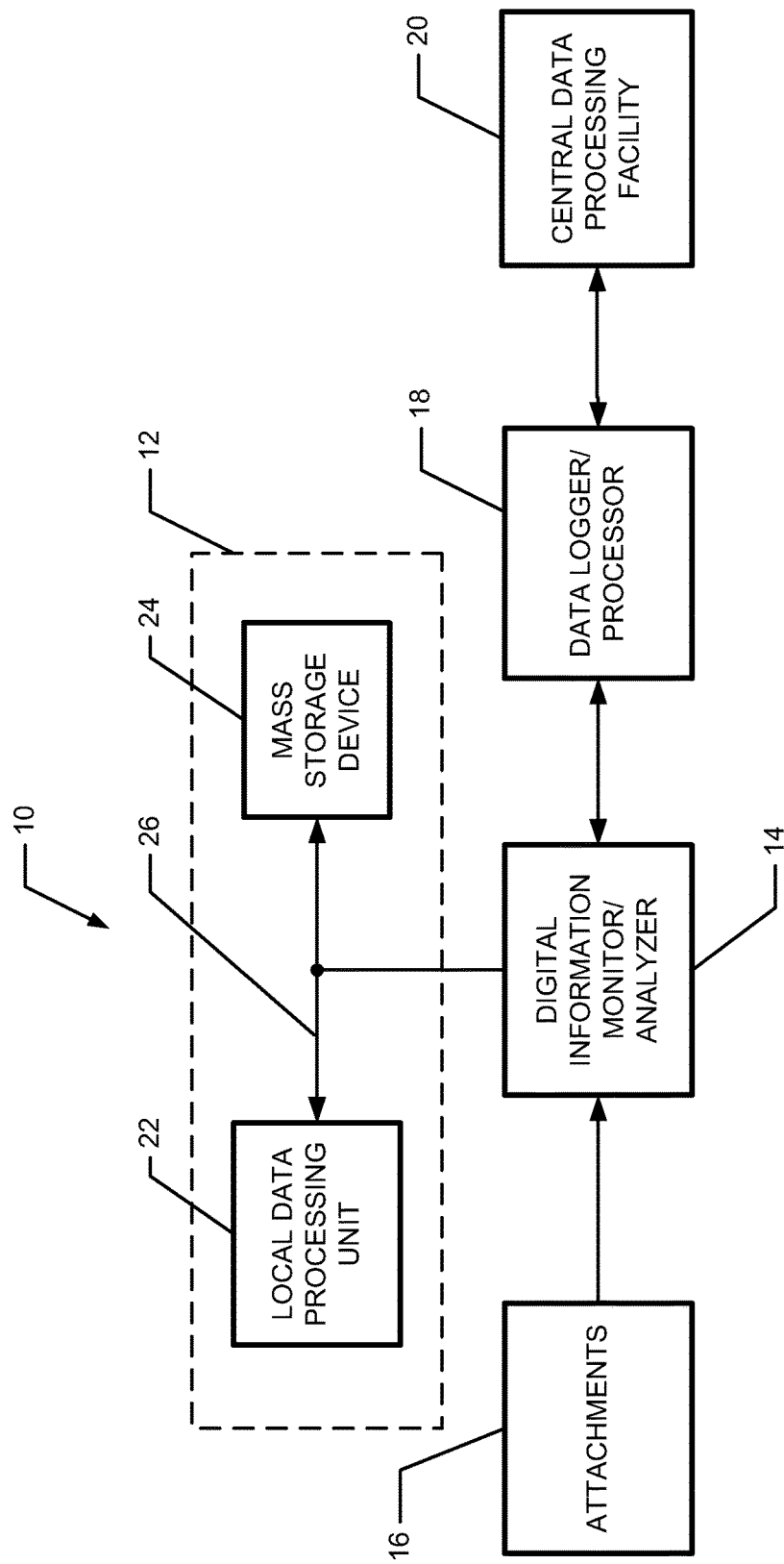
FIG. 1 is a block diagram of an example system that can be used to track a sequence of events associated with a digital recording device.

FIG. 1 is a block diagram of an example system 10 that can be used to track a sequence of events associated with a digital recording device 12. In the example of FIG. 1, the system 10 includes a digital information monitor/analyzer 14, one or more attachments 16, a data logger/processor 18 and a central data processing facility 20. In FIG. 1, the digital recording device 12 includes a local data processing unit 22 and a mass storage device 24 that are coupled via a data bus 26.

The digital recording device 12 may be a digital video recorder (DVR) or a personal video recorder (PVR), both of which are well-known devices. A PVR is a DVR that has been configured to be automatically adaptive to or otherwise automatically responsive to the viewing preferences of a particular user or group of users within a particular household. For example, many DVRs provide a phone line connection that enables the DVR to communicate with a central service facility that receives viewer preference information from the DVR and which sends configuration information to the DVR based on those viewer preferences. The configuration information is used by the DVR to automatically configure the DVR to record video programs consistent with the preferences of the viewer or viewers associated with that DVR. TiVo™ is one well-known service that is purchased by DVR owners to provide PVR functionality to their DVRs. Although the example embodiments described herein refer to the digital recording device 12 as a DVR or PVR that records video programming, the digital recording device 12 could be any other type of digital recording device that records any desired type of digital audio information, digital video information and/or digital image information. For example, the digital recording device 12 could be a personal computer recording any type of digital information including, for example, web pages, pushed data, audio data and/or video data.

The local data processing unit 22 shown within the digital recording device 12 includes the hardware and software necessary to process analog and/or digital signals containing video, audio, still image and/or text information received from one or more sources. For example, the digital recording device 12 may receive signals from a cable television line, a television tuner, a camcorder, a VCR, the Internet, etc, none of which are shown in FIG. 1. The local data processing unit 22 processes received signals and stores the processed signals as digital information on the mass storage device 24 via the data bus 26, sends the processed signals as analog and/or digital information to one or more devices such as, for example, a television, for live viewing, and/or retrieves and outputs for viewing digital information previously stored on the mass storage device 24.

The mass storage device 24 is preferably a hard drive or disk drive that uses a magnetic storage medium having, for example, eighty gigabytes or more of storage capacity. However, any other type of mass storage device could be used instead. For example, a hard drive or disk drive that uses an optical storage medium could be used, a magnetic tape drive could be used, or one or more solid state memory devices (e.g., integrated circuit memory such as flash memory, static random access memory, dynamic random access memory, etc.) could be used instead of, or in addition to, a disk drive. More generally, the mass storage device 24 may include any type or combination of memory devices that enables storage of a relatively large amount of digital information and which enables the relatively large amount of digital information to be written to and read (i.e., retrieved) from the mass storage device 24.

In the examples described herein, the data bus 26 is based on an integrated drive electronics (IDE) standard or protocol, which is a well known parallel data bus configuration and protocol for use with disk drives. However, the data bus 26 could instead be based on any other parallel or serial communication interface that enables digital information to be stored on and retrieved from the mass storage device 24.

The digital information monitor/analyzer 14 is in communication with the data bus 26 and monitors digital information transmitted between the local data processing unit 22 and the mass storage device 24 via the data bus 26. In general, the digital information monitor/analyzer 14 reads (i.e., snoops) control or command information transmitted on the data bus 26 to identify sets of digital information or digital information packets to be stored on or retrieved from the mass storage device 24. The control or command information may, for example, be one or more handshake signals, control register commands, etc., transmitted via the data bus 26 that cause the mass storage device 24 to write information received from the local data processing unit 22 and/or to retrieve or read digital information requested by the digital local data processing unit 22 and send that information to the local data processing unit 22.

The digital information monitor/analyzer 14 also reads digital information or packets transmitted by the local data processing unit 22 to the mass storage device 24 via the data bus 26 that contain storage location information associated with one or more digital data packets to be recorded on the mass storage device 24. The storage location information is preferably associated with a physical memory location on the mass storage device 24. Specifically, in the case where the mass storage device 24 is a disk drive, the storage location information corresponds to a cylinder, head and sector of the disk drive. Alternatively, the storage location information may correspond to a logical block address associated with the mass storage device 24.

In some examples, the digital information monitor/analyzer 14 stores time information together with storage location information on a non-volatile memory (not shown in FIG. 1) in communication with the digital information monitor/analyzer 14. The time information is preferably a current local time (e.g., current date and time of day information) which, as described in connection with the examples provided herein, is derived from a real-time clock or the equivalent thereof. In other examples, the digital information monitor/analyzer 14 stores or inserts time information together with the storage location information as a header to the digital information packets stored on the mass storage device 24, thereby eliminating the need to store the location and time information on a memory separate from the mass storage device 24.

The digital information monitor/analyzer 14 monitors the information transmitted via the bus 26 to recognize each occurrence of an operation that transfers a packet of digital data from the local data processing unit 22 to the mass storage device 24 or each occurrence of an operation that transfers a packet of digital data from the mass storage device 24 to the local data processing unit 22. In other words, the digital information monitor/analyzer 14 uses the information transmitted on the data bus 26 to identify individual events associated with recording information on the mass storage device 24 and/or retrieving information from the mass storage device 24. Additionally, the digital information monitor/analyzer 14 monitors the information transmitted via the data bus 26 to determine for each write operation or recording event where (i.e., the location) on the mass storage device 24 each packet of digital information is stored.

The digital information monitor/analyzer 14 adds time information such as, for example, a time stamp containing a current local time, which preferably includes a local date and time of day, to the location information associated with each write event or operation to form an event record for each write operation. The digital information monitor/analyzer 14 either compiles (using a look-up table format or any other type of data structure) the individual event records on a memory in communication with the digital information monitor/analyzer 14 or stores the individual event records as headers along with their corresponding digital data packets on the mass storage device 24. In this manner, the digital information monitor/analyzer 14 generates a sequence of events record reflecting a series of data transfers between the local data processing unit 22 and the mass storage device 24.

In addition to location and time information, the digital information monitor/analyzer 14 also includes source information with each event record. More specifically, the digital information monitor/analyzer 14 receives a source identifier such as a channel number from one of the attachments 16. The channel number may, in turn, correspond to a content provider such as a radio station, a television station, an Internet web page or pages, etc.

In examples where the digital information monitor/analyzer 14 stores event records in a memory separate from the mass storage device 24, the digital information monitor/analyzer 14 reads information transmitted on the data bus 26 to determine if a previously stored packet of digital information is to be retrieved from the mass storage device 24 in response to a request from the local data processing unit 22. Then, as described in greater detail in connection with the examples below, the digital information monitor/analyzer 14 reads information transmitted on the data bus 26 to derive storage location information associated with the set or packet of digital information to be retrieved. The storage location information is compared or mapped to the storage location information in the sequence of events record. When an event record having the same storage location information is found in the sequence of events record, a playback time, which is preferably a current local time, is associated with (e.g., appended to) that event record. On the other hand, in examples where the digital information monitor/analyzer 14 stores event records as headers along with corresponding packets of digital data or information on the mass storage device 24, a current local time is appended or otherwise added to the header information to form a playback event record that is sent to and stored within the data logger/processor 18.

The data logger/processor 18 periodically sends event records that have either been retrieved from a sequence of event records stored in a memory in communication with the digital audio/video information monitor analyzer 14 or that have been previously collected and stored in the data logger/processor 18 to the central data processing facility 20. The central data processing facility 20 can then further process the event records to ascertain various audience behaviors such as, for example, statistical viewing patterns that may be used to develop ratings information for various audio programs, video programs, and/or other sources of information such as web pages.

Figure 2:
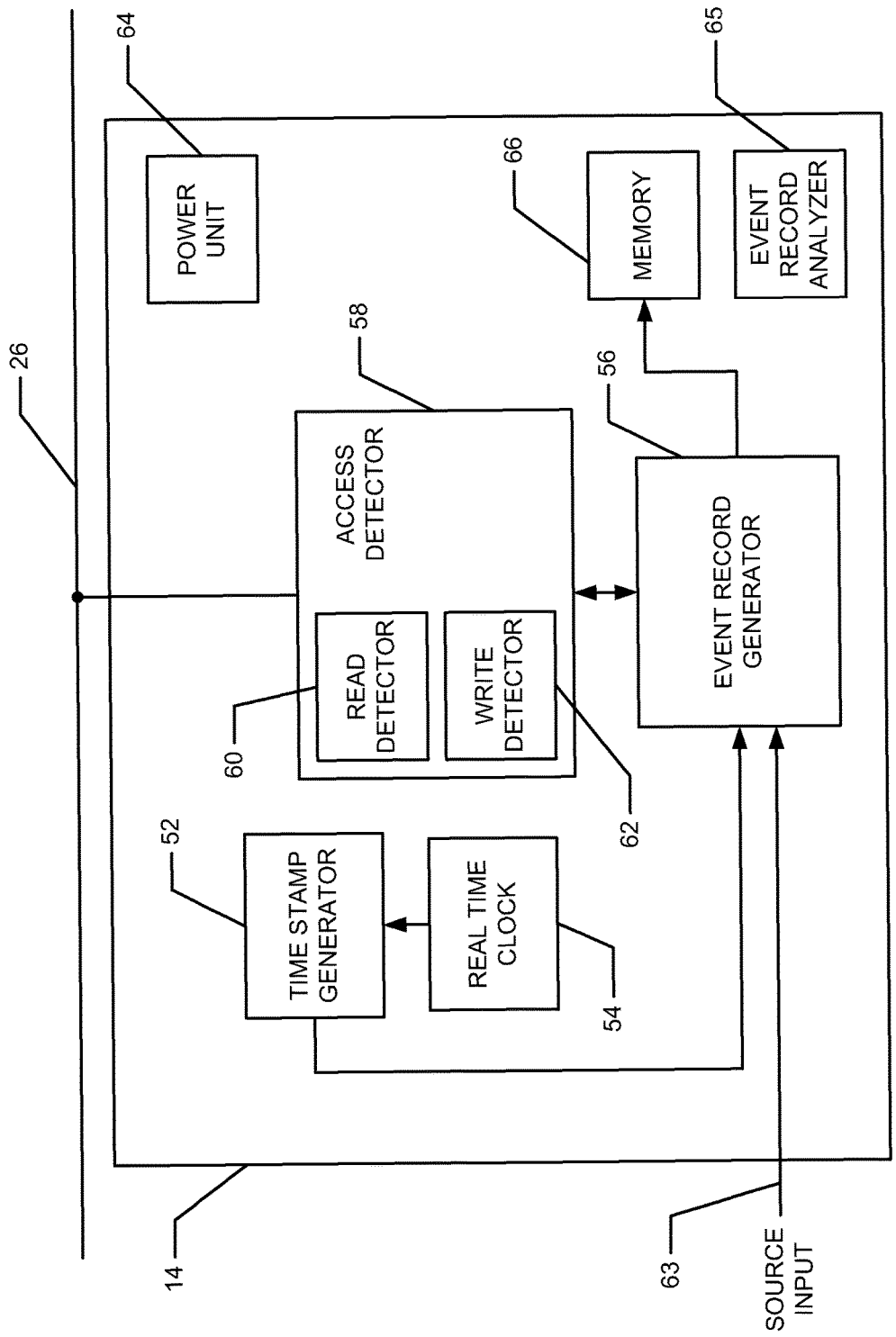
FIG. 2 is a more detailed block diagram of an example digital information monitor/analyzer that may be used as the digital information monitor/analyzer shown in FIG. 1.

FIG. 2 is a more detailed block diagram of an example of the digital information monitor/analyzer 14 shown in FIG. 1. In the example of FIG. 2, the digital information monitor/analyzer 14 includes a time stamp generator 52, a real-time clock 54, an event record generator 56, and an access detector 58. The access detector 58 has a read detector 60 and a write detector 62 associated therewith. The event record generator 56 receives a source input 63, which may, for example, be one of the attachments 16 shown in FIG. 1. Of course, the source input 63 does not necessarily have to be provided by one of the attachment 16. For example, the source input 63 may instead be provided by apparatus and techniques that detect a source by analyzing or decoding audio content, video content, etc. In particular, signature detection systems and methods (many of which are well known), systems and methods that insert a tag or other identifier (which are also known), etc. may be used instead. Additionally, the digital information monitor/analyzer 14 includes a power unit 64 and may optionally include an event record analyzer 65 and/or a memory 66 that is in communication with the event record generator 56.

The real-time clock 54 provides information to the time stamp generator 52 that enables the time stamp generator 52 to develop or generate a time stamp including current local date information and time of day information. The time stamp generator 52 provides time stamps that are used by the event record generator 56 to create event records.

The access detector 58 is in communication with the data bus 26 and monitors the information transmitted thereon to determine when digital information is to be stored on or retrieved from the mass storage device 24. In particular, the access detector 58 monitors control and command signals present on the data bus 26 to determine if digital information is to be stored and/or recorded on the mass storage device 24. In examples where the mass storage device 24 is a disk drive and the data bus 26 is based on an IDE standard or protocol, the access detector 58 monitors a set of signals commonly associated with the protocol such as the command and control register select signals $\overline{CS0}$ and $\overline{CS1}$, a set of control register select signals DA0, DA1 and DA2, and a lower data bus data byte via signals on set of data lines, DD0 through DD7, to determine whether a read or write operation is in progress and to determine what location on the mass storage device 24 is involved in the read or write operation. To better understand the manner in which the write detector 62 determines that a write operation is in progress, an example sequence of signals for an IDE protocol compatible write operation on the data bus 26 is provided in Table 1 below.

TABLE 1

WRITE 65,536 BYTES OF DATA TO DRIVE

| $\overline{CS0}$ | $\overline{CS1}$ | DA2 | DA1 | DA0 | Register Addressed | Data Low (DD7-DD0) | Action/Meaning |
|---|---|---|---|---|---|---|---|
| 0 | 1 | 1 | 1 | 0 | 3F6 | 08H | Enable interrupts |
| 1 | 0 | 0 | 1 | 0 | 1F2 | 00H | Sectors = 256 |
| 1 | 0 | 0 | 1 | 1 | 1F3 | 40H | LBA = 11EF240H |
| 1 | 0 | 1 | 0 | 0 | 1F4 | F2H | |
| 1 | 0 | 1 | 0 | 1 | 1F5 | 1EH | |
| 1 | 0 | 1 | 1 | 0 | 1F6 | E1H | |
| 1 | 0 | 1 | 1 | 1 | 1F7 | CAH | Write to drive |

As shown in the above table, for examples where the data bus 26 operates according to the IDE protocol and the mass storage device 24 is an IDE compatible disk drive, the write detector 62 can detect a write or record operation to the mass storage device 24 by determining that the value CAH (i.e., CA hexadecimal) is to be stored in a register 1F7 of the disk drive. In addition, the access detector 58 determines the location of the write operation by looking at the values to be stored in a set of registers 1F3 through 1F6. In the example shown in Table 1, the disk drive has been configured to operate in a logical block addressing (LBA) mode as opposed to a cylinder/head/sector (C:H:S) addressing mode. However, as is well known, LBA addresses are mathematically related to C:H:S addresses by the expression LBA= (cylinder*headcount+headnumber)*sector count+sector number−1. Thus, either addressing mode can be used without affecting the performance of the access detector 58.

The access detector 58 can also detect the size of the packet of information or data that is to written to the disk drive. In the example shown in Table 1, 256 sectors (i.e., 65,536 bytes) of digital information are to be written to the disk drive. In general, audio, video and/or image information is written in relatively large sets or packets such as, for example, packets containing 65,536 bytes of information. Thus, if desired, the access detector 58 can determine if a packet of digital information to be written to the disk drive or mass storage device 24 contains audio, video and/or image information. In particular, audio, video and/or image information is usually transmitted to the mass storage device 24 in relatively large or maximum size packets (e.g., 65,536 byte packets). As a result, if the value written to a register 1F2 is representative of only a few sectors of information, then the access detector 58 may be configured to ignore the operation. In this manner, the access detector 58 can be configured to discriminate between different types of content, some of which may be audio, video or image information of interest and some of which may be other information that is not needed by the event record generator 56. In some examples, such as where web page accesses are monitored, it may not be desirable to ignore any operations or data transfers, regardless of the amount of information contained in the data packets.

To better understand the manner in which the read detector 60 determines that a read operation is in progress, a sequence of signals for an IDE protocol compatible read operation on the data bus 26 is provided in Table 2 below.

TABLE 2

READ 65,536 BYTES OF DATA FROM DRIVE

| $\overline{CS0}$ | $\overline{CS1}$ | DA2 | DA1 | DA0 | Register Addressed | Data Low (DD7-DD0) | Action/Meaning |
|---|---|---|---|---|---|---|---|
| 0 | 1 | 1 | 1 | 0 | 3F6 | 08H | Enable interrupts |
| 1 | 0 | 0 | 1 | 0 | 1F2 | 00H | Sectors = 256 |
| 1 | 0 | 0 | 1 | 1 | 1F3 | 40H | LBA = 11EF240H |
| 1 | 0 | 1 | 0 | 0 | 1F4 | F2H | |
| 1 | 0 | 1 | 0 | 1 | 1F5 | 1EH | |
| 1 | 0 | 1 | 1 | 0 | 1F6 | E1H | |
| 1 | 0 | 1 | 1 | 1 | 1F7 | C8H | Read from drive |

As shown in the above table, for examples where the data bus 26 is based on the IDE protocol and the mass storage device 24 is an IDE compatible disk drive, the read detector 60 can detect a read or playback operation by determining that the value C8H is to be stored in a register 1F7. In addition, the access detector 58 determines the target location of the read operation by looking at the values to be stored in a set of registers 1F3 through 1F6.

The event record generator 56 is in communication with the access detector 58 and the time stamp generator 52. The event record generator 56 generates event records containing time information and storage location information uniquely corresponding to each set or packet of digital information to be written to the mass storage device 24. In addition, the event record generator 56 receives source information such as, for example, channel information via the source input 63 and includes the source or channel information in each of the event records. Table 3 below provides two example event records that could be generated in response to two successive write operations, each of which includes a 65,536 byte packet or set of digital information associated with channel 11, to the mass storage device 24.

TABLE 3

| Storage location (LBA) | Event Record Generated (date, time of day, source) |
|---|---|
| 11EF240H | 7/30/02 16:05:31 011 |
| 11EF340H | 7/30/02 16:05:32 011 |

As shown in Table 3 above, the 65,536 byte packets associated with the successive write operations were written to or recorded on the mass storage device 24 one second apart. Additionally, the LBAs are 65,536 bytes apart and are logically successive storage locations on the mass storage device 24. While the example of Table 3 shows that the successive write operations occurred one second apart, the time between successive write operations could instead be a fraction of a second apart or more than one second apart. In general, the speed or rate (e.g., the bits per second) at which data can be recorded on the mass storage device 24 and/or the amount of data written in each packet affects the amount of time between successive writes. In particular, as the maximum record rate limit of the mass storage device 24 increases and as the packet size decreases, the time between successive write operations decreases. Conversely, as the maximum record rate limit of the mass storage device 24 decreases and as the packet size increases, the time between successive write operations increases.

For examples where the digital information monitor/analyzer 14 includes the optional memory 66, the information shown in Table 3 may be stored in the memory 66 as a look-up table. The look-up table is used as described in detail below to modify the event record to include a read or playback time, which in the case of digital video information usually corresponds to a viewing time. Thus, in the example where the access detector 58 determines that the contents of the storage location 11EF240H are to be read from the mass storage device 24 on Jul. 30, 2002 at 16:30:00 and the contents of the storage location 11EF340H are to be read one second later, the look-up table stored in the memory 66 contains the information shown in Table 4 below.

TABLE 4

| Storage location (LBA) | Event Record Generated (date, time of day, source) | Playback Time (Read Time) |
|---|---|---|
| 11EF240H | 7/30/02 16:05:31 011 | 7/30/02 16:30:00 |
| 11EF340H | 7/30/02 16:05:32 011 | 7/30/02 16:30:01 |

Thus, in some examples, the event record generator 56 maintains a table or other data structure in the memory 66 that contains a sequence of events record, which enables tracking of read and write operations. In the example shown in FIG. 1 where the digital information monitor/analyzer 14 is in communication with the data bus 26 of the mass storage device 24, the read and write operations in a sequence of events record (one example of which is shown in Table 4) correspond to record and playback operations, respectively.

As can be seen from Tables 3 and 4 above, a sequence of events record can be used to maintain a record of write or record events that is indexed by the storage location on the mass storage device 24 (FIG. 1). In other words, for each storage location (e.g., each logical block address) on the mass storage device 24 there is a corresponding event record containing the time at which the set of data or data packet associated with the write operation was written or recorded on the mass storage device 24 as well as the source or channel from which the audio, video and/or image information within the data packet was originally derived. When a read or playback operation occurs, the storage location to be read or played back is used to find the previously stored event record created at the time the information to be read or played back was recorded on the mass storage device 24. Once found, a current local time is added to the event record to record the read or playback event. The event record analyzer 65 may be used to periodically analyze the sequence of events record, which includes all of the write and read events associated with the digital information monitor/analyzer 14, stored in the memory 66 to ascertain recording and playback habits or behavior associated with those using the digital recording device 12. Of course, in the case where the attachments 16 include a people detector, the digital information monitor/analyzer 14 may also generate event records containing information relating to the number and/or identities of those persons involved in the playback event.

For examples in which the digital information monitor/analyzer 14 does not include the memory 66, the event record generator 56 creates event headers that are stored on the mass storage device 24 along with their respective data packets or sets of digital information. As a result, location information is irrelevant for these examples and, thus, the access detector 58 does not use location information and the event record generator 56 does not store location information on the mass storage device 24.

Figure 3:
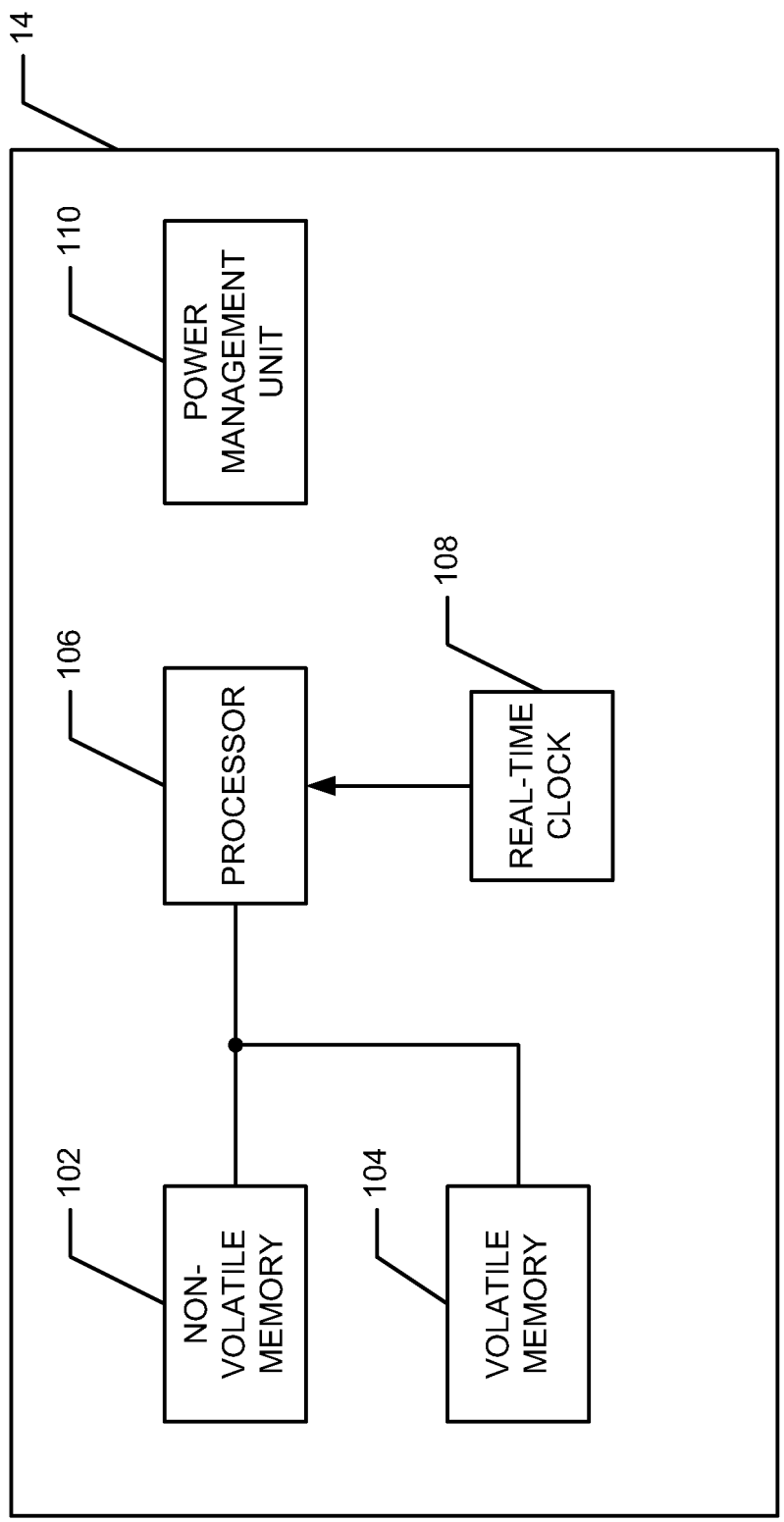
FIG. 3 is a detailed block diagram of another example digital information monitor/analyzer that may be used as the digital information monitor/analyzer shown in FIG. 1.

FIG. 3 is a detailed block diagram of another manner of implementing the digital information monitor/analyzer 14 shown in FIG. 1. As shown in FIG. 3, the digital information monitor/analyzer 14 includes a non-volatile memory 102 and a volatile memory 104 in communication with a processor 106. In addition, the digital information monitor/analyzer 14 includes a real-time clock 108 in communication with the processor 106 and a power management unit 110.

The non-volatile memory 102 may be a flash memory or any other type of non-volatile memory. Alternatively, the non-volatile memory 102 could be another mass storage device such as, for example, a disk drive. The volatile memory 104 may be a dynamic random access memory, a static random access memory, or any other suitable type of volatile memory. The processor 106 may be any type of microprocessor, microcontroller, ASIC, RISC, etc. capable of executing instructions, which are stored in the non-volatile memory 102 and/or the volatile memory 104, to perform the functions described in connection with the examples of the digital information monitor/analyzer 14 shown in FIGS. 1 and 2. Further, although the memories 102 and 104 are shown as separate devices they may be integrated within a single device and/or each of the memories 102 and 104 may include multiple memory devices. The real-time clock 108 enables the processor 106 to calculate current local time information and to generate time stamp information for event records therefrom.

At power up, the power management unit 110 enables the processor 106 to copy some or all of the contents of the non-volatile memory 102 to the volatile memory 104. During normal operation, the processor 106 stores event records (in response to write operations) and updates or adds playback time information to previously stored event records in response to read operations on the volatile memory 104. At power down, the power management unit 110 enables the processor 106 to store the contents (including any sequence of events record stored thereon) of the volatile memory 104 on the non-volatile memory 102. In this manner, the number of write/read cycles that the non-volatile memory 102 is subjected to is greatly reduced. As a consequence, the useful life of the non-volatile memory 102 can be greatly extended because, as is well known, non-volatile memories typically provide a relatively limited number of write/read cycles before failing.

Alternatively, the non-volatile memory 102 could be eliminated and a battery could be coupled to the volatile memory 104 to provide continuous power to the volatile memory 104 when external power is not otherwise provided to the digital information monitor/analyzer 14. Such battery-backed volatile memory configurations are well known and, thus, are not described in greater detail herein.

Example programs for implementing the apparatus of FIGS. 2 and 3 are shown in FIGS. 4, 5, 7 and 14. In these examples, the programs are for execution by a processor and are embodied in processor instructions stored on a tangible medium such as a CD-ROM, a floppy disk, a hard drive, a digital versatile disk (DVD), or a memory associated with the processor. However, persons of ordinary skill in the art will readily appreciate that the entire program or parts thereof could alternatively be executed by a device other than the processor and/or embodied in firmware or dedicated hardware in a well-known manner. For example, any or all of the access detector 58, the read detector 60, the write detector 62, the time stamp generator 52 and/or the event record generator 56 could be implemented by any combination of software, hardware and/or firmware. Further, although the example programs are described with reference to flowcharts, persons of ordinary skill in the art will readily appreciate that many other methods of implementing the apparatus may alternatively be used. For example, the order of execution of the blocks shown in these flowcharts may be changed, and/or some of the blocks described may be changed, eliminated or combined.

Figure 4:
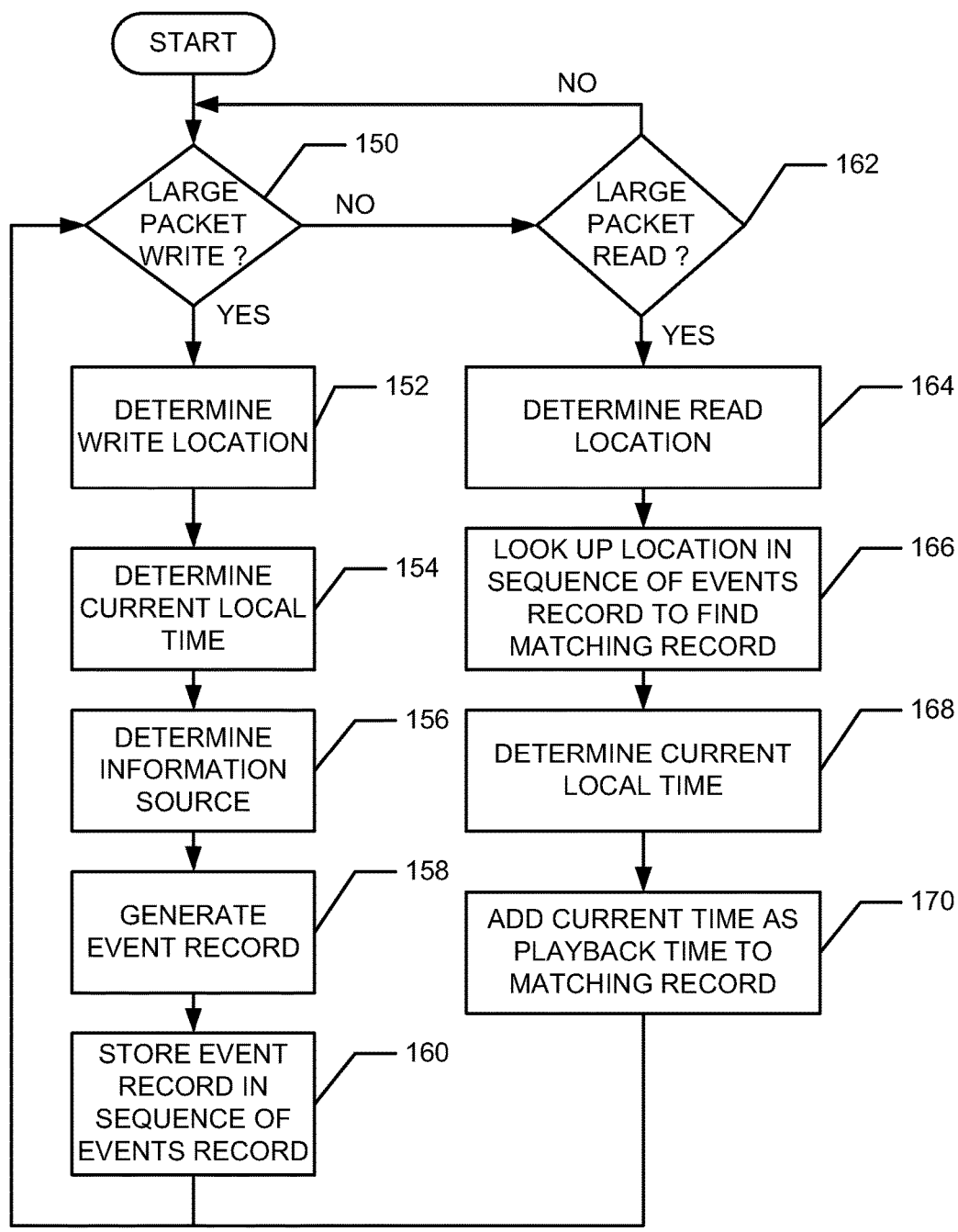
FIG. 4 is a flow diagram illustrating one example manner in which the digital video information monitor/analyzer devices shown in FIGS. 1, 2 and 3 may be configured to generate event records and a sequence of events record.

FIG. 4 is an example flow diagram illustrating one manner in which the digital video information monitor/analyzer 14 may be configured to generate event records and a sequence of events record. The program illustrated in FIG. 4 is used with examples of the digital information monitor/analyzer 14 that maintain a sequence of events record using, for example, a look-up table in a memory separate from the mass storage device 24. For purposes of clarity, the program shown in FIG. 4 is described as being performed by the example of the digital information monitor/analyzer 14 shown in FIG. 2. However, the program shown in FIG. 4 can be used with other digital information monitor/analyzer devices.

As shown in FIG. 4, the write detector 62 determines if a large packet is to be stored (i.e., written to, recorded on, etc.) on the mass storage device 24 (block 150). Digital audio, video and image information is typically transmitted in relatively large packets. For example, in the example where the digital recording device 12 is a DVR, video program information is typically sent to the mass storage device 24 in 65,536 byte packets, whereas user configuration information and other configuration information is usually sent is much smaller packets such as, for example, 512 byte packets. Thus, selectively generating event records for only large packets (all or most of which contain digital audio, video and/or image information) minimizes the size of the sequence of events record and the amount of memory and processing overhead needed to manage the sequence of events record. Of course, limiting recording of events to large data packets is optional and, if desired, all read and write operations may be recorded.

If a large packet is to be stored on the mass storage device 24 (block 150), the access detector 58 determines the location (e.g., the LBA) to which the digital information is to be written or stored (block 152) on the mass storage device 24, determines a current local time (block 154) and determines the source (e.g., the channel) associated with the information to be stored or recorded on the mass storage device 24 (block 156). The event record generator 56 then generates an event record containing the current local time and the source information (block 158). The event record generator 56 then stores the event record, preferably in the memory 66, in the sequence of events record according to the location information (e.g., in a look-up table format indexed by the location information) (block 160).

If a large packet write is not detected (block 150), the read detector 60 determines if a large packet of digital information is to be read from the mass storage device 24 (block 162). In general, a large packet read corresponds to a playback of digital audio, video and/or image information. For instance, in the example where the mass storage device 24 communicates using an IDE protocol, a packet containing digital audio, video and/or image information may be 65,536 bytes, which corresponds to 256 sectors. In addition, the IDE protocol permits the use of multiple read/write commands that enable the transmission of packets containing more than 256 sectors of digital information within a single data transaction with a mass storage device.

If the read detector 60 detects a large packet read (block 162), the access detector 58 determines, based on digital information transmitted on the data bus 26, the location on the mass storage device 24 from which the packet is to be read (block 164). The event record generator 56 then uses the location information to look up the previously stored event record corresponding to that location information in the sequence of events record (i.e., in the look-up table) (block 166). One particularly useful manner of enabling the event record generator 56 to rapidly look up the event record corresponding to the location information transmitted on the data bus 26 establishes a one-to-one correspondence between memory addresses within the memory 66 and the permissible storage locations available within the mass storage device 24. Thus, for examples where the mass storage device 24 is an IDE compatible disk drive, each LBA or C:H:S location on the mass storage device 24 may be directly mapped to an address within the memory 66. In any event, the time stamp generator 52 then determines a current local time (e.g., a date and time of day) (block 168) and the event record generator 56 adds that current local time information to the event record found at block 166 (block 170).

Figure 5:
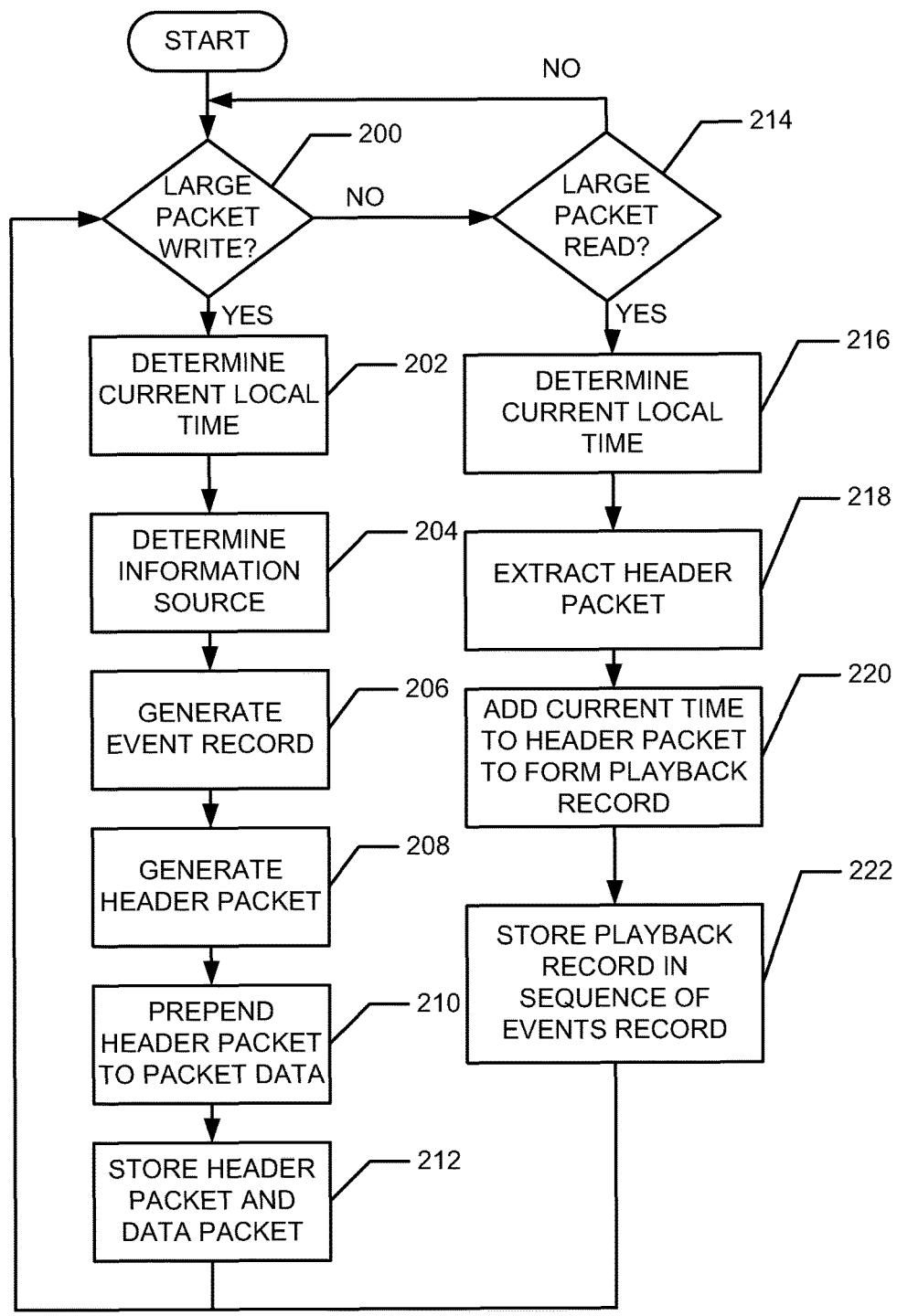
FIG. 5 is a flow diagram of another example manner in which the digital information monitor/analyzer devices shown in FIGS. 1, 2 and 3 may be configured to generate a sequence of events record.

FIG. 5 is a flow diagram of another example manner in which the digital information monitor/analyzer 14 may be configured to generate a sequence of events record. The example program shown in FIG. 5 is used with examples of the digital information monitor/analyzer 14 that store event records as headers along with digital information on the mass storage device 24, as opposed to storing event records in a table or other data structure in a memory separate from the mass storage device 24.

As shown in FIG. 5, the write detector 62 determines if a large packet is to be written to (i.e., recorded on) the mass storage device 24 (block 200). Of course, if desired, a packet size restriction does not have to be implemented. If a large packet is to be written, the time stamp generator 52 determines a current local time (block 202), the access detector 58 determines the source of the packet information (block 204) and the event record generator 56 generates an event record containing the current local time information and source information (block 206). A header packet is formed by the event record generator 56 using the event record (block 208) and the header packet is prepended or inserted in the data stream of information written to the mass storage device 24 (block 210) so that the header packet is stored along with its corresponding data packet on the mass storage device 24 (block 212).

If the write detector 62 determines that a large packet is not being written to the mass storage device 24 (block 200), the read detector 60 determines if a large packet is to be read from (e.g., played back from) the mass storage device 24 (block 214). If a large packet is to be read from the mass storage device 24, the event record generator 56 determines a current local time (e.g., a date and time of day) (block 216), extracts the header packet associated with the packet to be read (block 218) and adds the current local time to the extracted header packet to form a playback record (block 220). The event record generator 56 then stores the playback record in a sequence of events record, which may contain a plurality of playback records (block 222).

Figure 6:
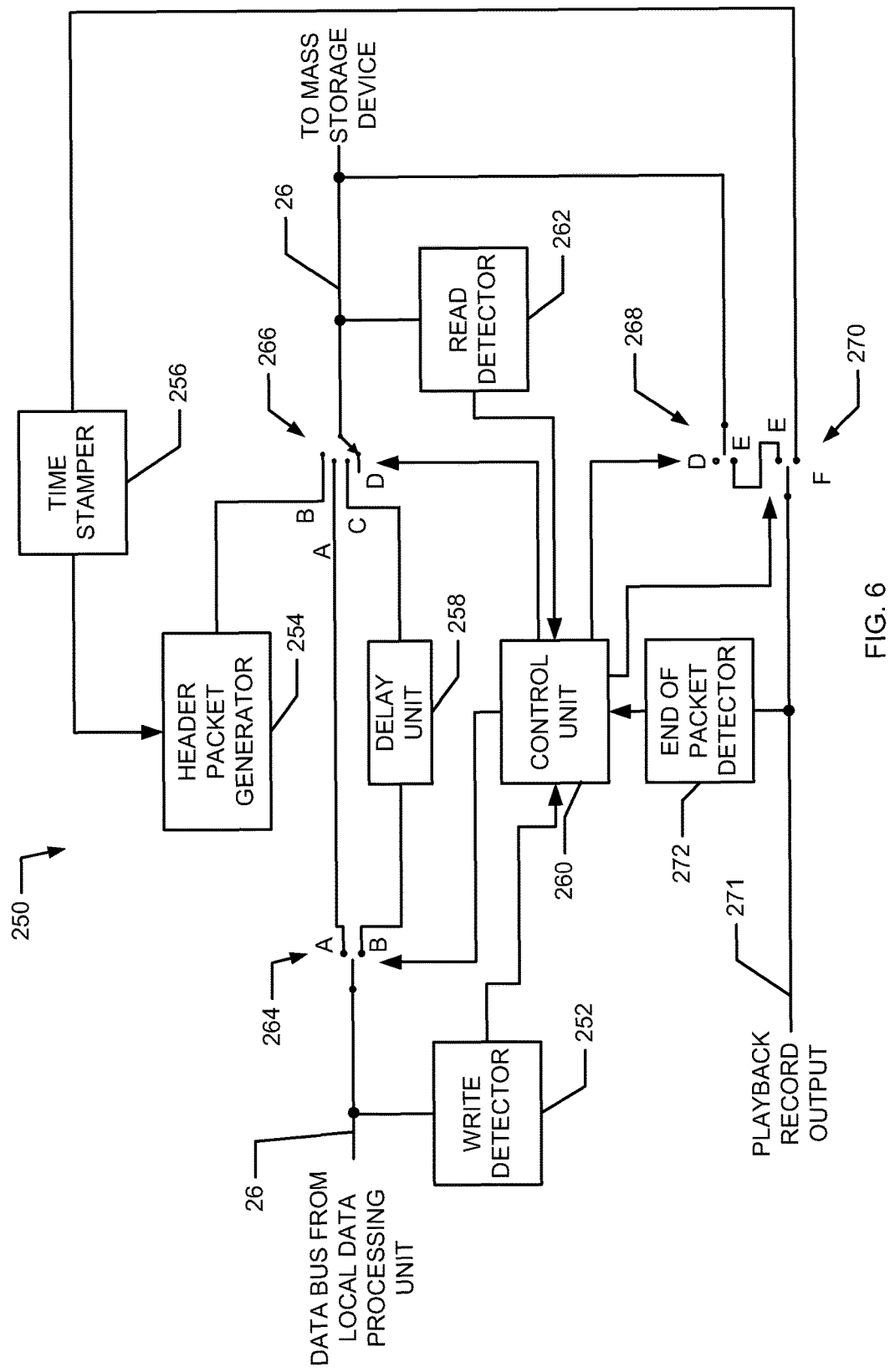
FIG. 6 is a block diagram of an example header packet insertion/extraction apparatus that may be used within one or more of the digital information monitor/analyzer devices shown in FIGS. 1, 2 and 3 to carry out the example method shown in FIG. 5.

FIG. 6 is a block diagram of an example header packet insertion/extraction apparatus 250 that may be used within the digital information monitor/analyzer 14 to carry out the example method shown in FIG. 5. As shown in FIG. 6, the header insertion/extraction apparatus 250 is serially interposed in the data bus 26 between the local data processing unit 22 and the mass storage device 24. The apparatus 250 includes a write detector 252, a header packet generator 254, a time stamper 256, a delay unit 258, a control unit 260, a read detector 262, switches 264, 266, 268 and 270, a playback record output 271, and an end of packet detector 272.

Normally, the switches 264, 266, 268 and 270 are in positions A, A, D and E, respectively. However, when the write detector 252 detects a write operation (e.g., a value of CA hexadecimal is written to register 1F7 of an IDE compatible mass storage device), the control unit moves switches 264 and 266 to their respective B positions. As a result, any digital information transmitted on the bus 26 to the mass storage device 24 is delayed by delay unit 258, which can be implemented using a plurality of shift registers or the like. While the data packet is delayed by the delay unit 258, the header packet generator 254 generates a header packet containing current local time information derived from the time stamper 256. In addition, the header packet may contain source information generated by one of the attachments 16 (FIG. 1). The header packet is then transmitted to the mass storage device 24 on the data bus 26. After the header packet has been transmitted and before the data packet reaches the output of the delay unit 258, the control unit 260 causes the switch 266 to move to position C, thereby enabling the data packet to be conveyed to and stored on the mass storage device 24. After the data packet is stored on the mass storage device 24, the control unit 260 returns the switches 264 and 266 to their respective A positions.

When the read detector 262 detects that information is to be retrieved or read from the mass storage device 24 (e.g., a value of C8 hexadecimal is written to the 1F7 register of an IDE compatible mass storage device), the control unit 260 and/or read detector 262 may be used to detect if a header packet exists. If a header packet exists, the control unit 260 causes the switch 264 to be in its A position, the switch 266 to be in its D position, and the switches 268 and 270 to be in their respective E positions. The previously stored header packet is then routed to the playback record output 271.

When the end of packet detector 272 detects the end of the header packet, the end of packet detector 272 sends a signal to the control unit 260, which, in turn, causes the switch 270 to move to its F position and the switch 266 to move to its A position. With the switch 270 in its F position, the time stamper 256 is enabled to provide current time information via the playback record output 271. In this manner, the playback record output 271 provides the originally recorded header packet information, which includes the time at which the data packet was written to or stored on the mass storage device 24, and a read time or playback time for the data packet.

Figure 7:
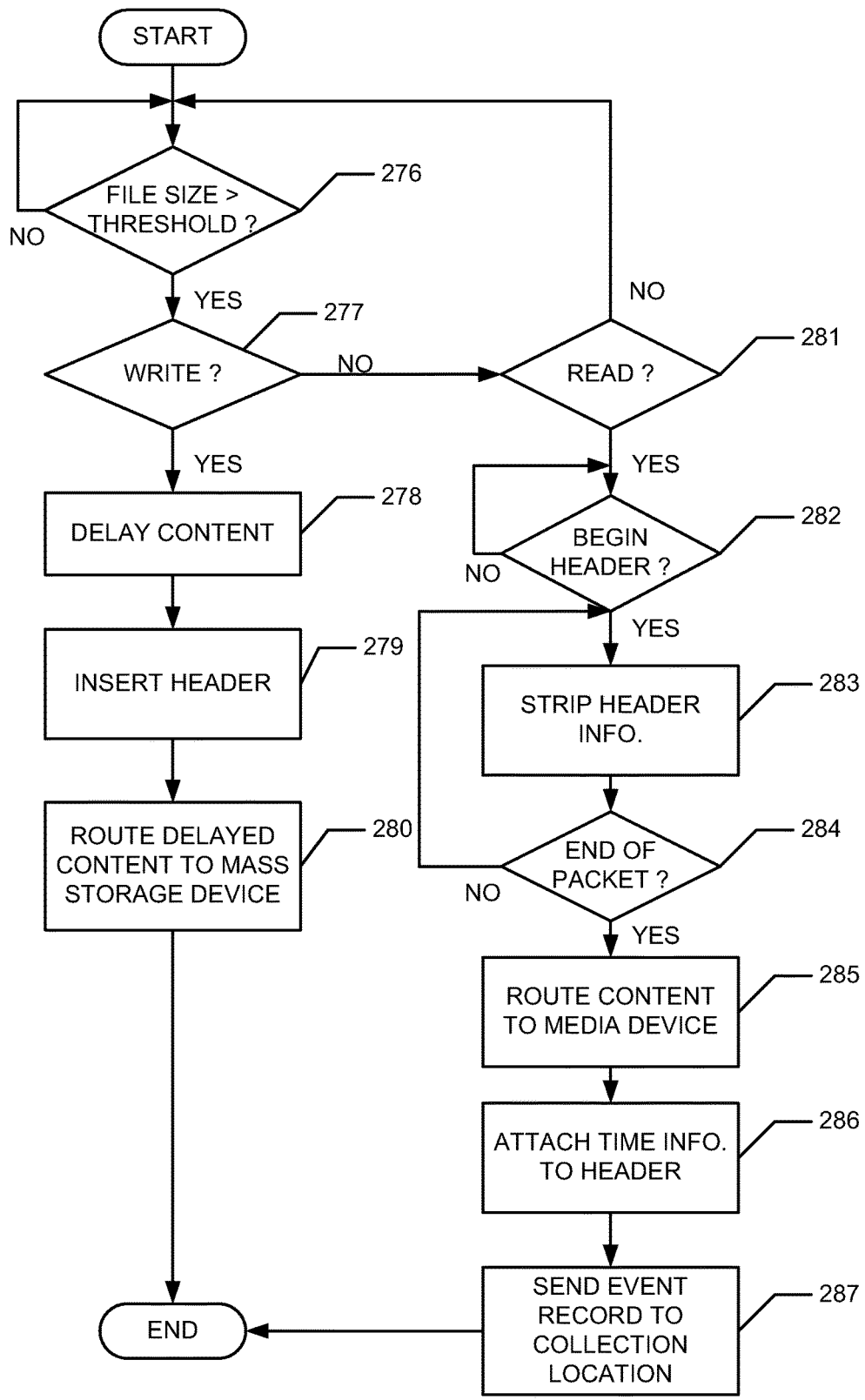
FIG. 7 is a flow diagram of an example manner in which the header packet insertion/extraction apparatus shown in FIG. 6 may be used within the information monitor/analyzer devices shown in FIGS. 1, 2 and 3 to generate a sequence of events record.

FIG. 7 is a flow diagram of an example manner in which the header packet insertion/extraction apparatus shown in FIG. 6 may be used within the information monitor/analyzer devices shown in FIGS. 1, 2 and 3 to generate a sequence of events record. As shown in FIG. 7, the digital information monitor/analyzer 14 determines if the file size (i.e., the amount of data) associated with a pending data transfer on the data bus 26 is greater than a threshold size associated with an audio, video and/or image file (block 276). If the digital information monitor/analyzer 14 determines that the file size exceeds the threshold value, then the write detector 252 determines if a write operation is pending (block 277).

If the write detector 252 determines that a write operation is pending or occurring (block 277), the control unit 260 configures the switch 264 to route the file being transferred from the local data processing unit 22 to the mass storage device 24 via the data bus 26 through the delay unit 258, thereby delaying the audio, video and/or image information or content being sent via the bus 26 (block 278). The control unit 260 then sets the switch 266 to its B position to enable the insertion of a header packet on the data bus 26 (block 279). Because the audio, video and/or image information or content is delayed, the header packet is sent to the mass storage device 24 immediately ahead of the content information and, thus, is effectively prepended to the content information. The prepended or inserted header packet contains time information generated by the time stamper 256 and may also contain source information and information indicating or otherwise marking the beginning and end of the header packet. After the header packet is conveyed to the mass storage device 24 via the data bus 26, the control unit 260 sets the switch 266 to its C position to enable the delayed audio, video and/or image content information to be conveyed or routed to the mass storage device 24 (block 280).

If a write operation is not detected (block 277), the read detector 262 determines if a read operation is pending on the data bus 26 (block 281). If a read operation is pending, the control unit 260 uses the read detector 262 to determine if the beginning of the header packet is being transmitted on the data bus 26 (block 282). If the beginning of the header packet is detected (block 282), the control unit 260 sets the switches 268 and 270 to their respective E positions to strip the header information from the data bus 26 (i.e., the header information is not routed back to the local data processing unit for display, playback, etc. via a media device such as, for example, a television) (block 283). The end of packet detector 272 determines if the end of the header packet has been transmitted on the data bus 26 (block 284). If the end of the header packet has not been detected (block 284), then the control unit 260 continues to route or strip the header packet information from the data bus 26 and sends it to the playback record output 271. On the other hand, if the end of packet detector 272 detects the end of the header packet, the control unit 260 sets the switches 264 and 266 to their A positions, the switch 268 to its D position and the switch 270 to its F position. As a result, digital audio, video and/or image content associated with the stripped header packet is routed via the data bus 26 to a media device such as, for example, the local data processing unit 22 within a DVR, PVR, etc. (block 285). In addition, the time stamper 256 provides time information (e.g., date and time of day information) to the playback record output 271 via the switch 270, thereby effectively attaching the time information, which in this example, is a playback time, to the header information (block 286). The playback record output 271 may convey the header information, including playback time information, as an event record to a central collection location such as, for example, the data logger/processor 18 (block 287).

Figure 8:
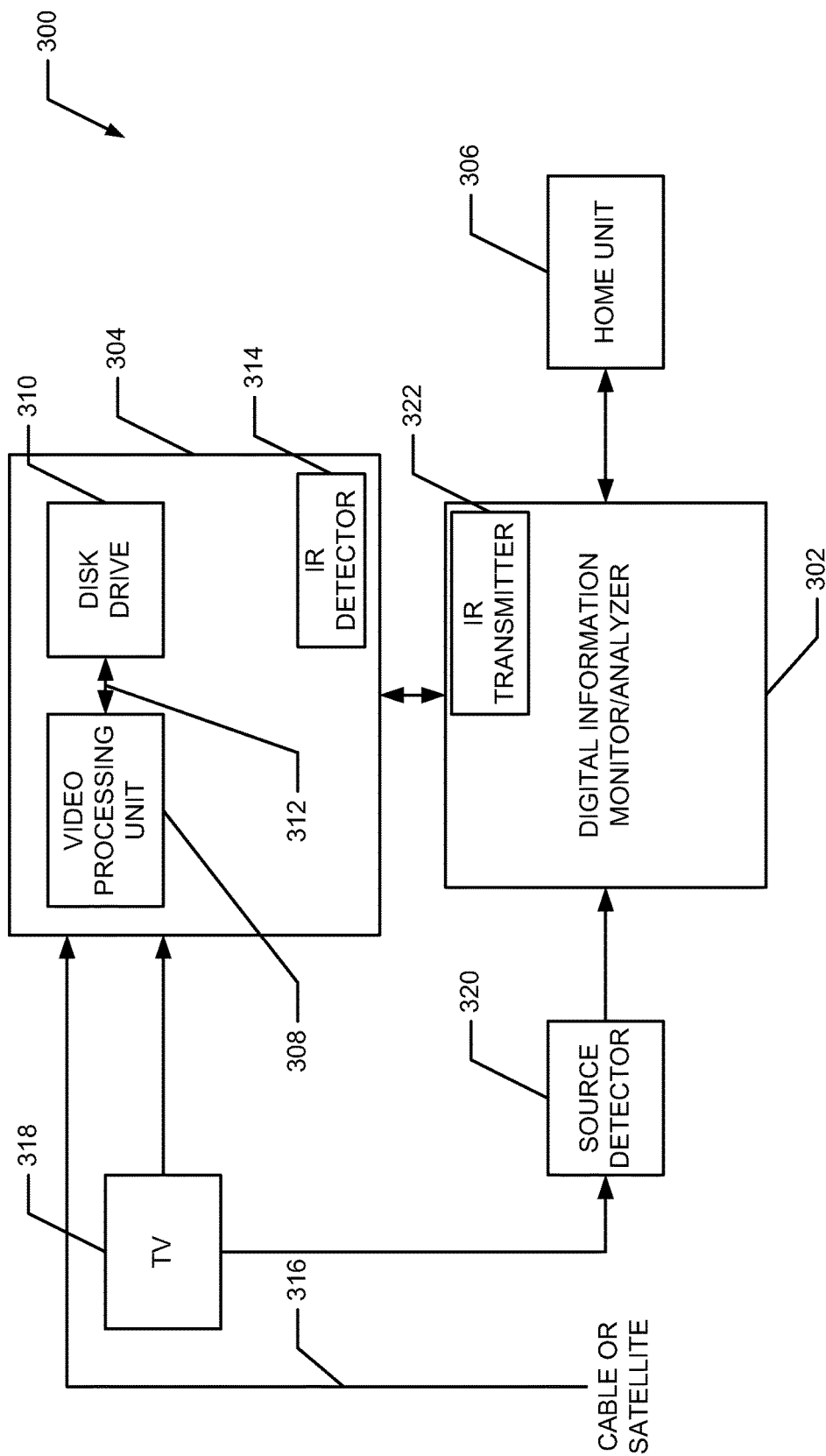
FIG. 8 is a block diagram of an example system that uses a digital information monitor/analyzer in conjunction with a DVR and an audience measurement unit.

FIG. 8 is a block diagram of an example system 300 that uses a digital information monitor/analyzer 302 in conjunction with a DVR 304, such as a TiVo™ system, and an audience measurement unit or home unit 306. As shown in FIG. 8, the DVR 304 includes a video processing unit 308 and a disk drive or hard drive 310 that are coupled via a data bus 312. The disk drive 310 is an IDE compatible device and uses a magnetic storage medium having a storage capacity of at least eighty gigabytes. However, the disk drive 310 may optionally use other storage media, have greater or less storage capacity and may communicate with the video processing unit 308 using any desired communication protocol and platform. The DVR 304 may also include an infrared detector 314 that receives commands and/or other control signals from a hand-held remote control device or another device having an infrared transmitter.

The DVR 304 is in communication with a cable or satellite television signal 316, to a television 318 and to the digital information monitor/analyzer 302. A source detector 320, which may, for example, be a frequency detector attachment, is in communication with the digital information monitor/analyzer 302 and provides tuning information thereto. The digital information monitor/analyzer 302 may optionally include an infrared transmitter 322 that enables the digital information monitor/analyzer 302 to communicate with the DVR 304 via its infrared detector 314. The digital information monitor/analyzer 302 may be configured identically or similarly to any of the examples of the digital information monitor/analyzer 14 shown and described in connection with FIGS. 1, 2 and 3.

The digital information monitor/analyzer 302 monitors the data bus 312 and generates event records containing recording times and sources and, if needed by the digital information monitor/analyzer 302, the storage locations of those event records on the disk drive 310. In addition, the digital information monitor/analyzer 302 adds read time, playback time or viewing time information to the event records to generate a sequence of events record that can be further analyzed, as described in greater detail below, by the digital information monitor/analyzer 302, the home unit 306 and/or a central data processing facility such as the facility 20 shown in FIG. 1 to ascertain audience viewing behaviors or habits.

Before discussing a specific example of an analysis of a sequence of events record generated by the digital information monitor/analyzer 302, a discussion of the general relationships between the various operational modes of the DVR 304 and the characteristics of a sequence of events record is provided in connection with FIGS. 9 through 12 below. For all of FIGS. 9 through 12, the horizontal axis represents the view time or playback time associated with the event records and the vertical axis represents the delay time (i.e., the difference between the playback or viewing time and the record time).

Figure 9:
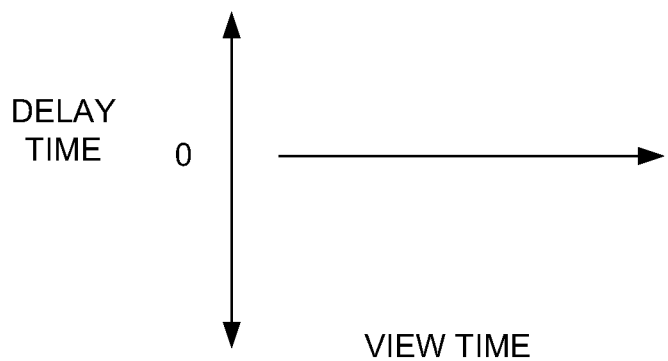
FIG. 9 is a graph that depicts an example of live viewing of a video program via a DVR.
Figure 10:
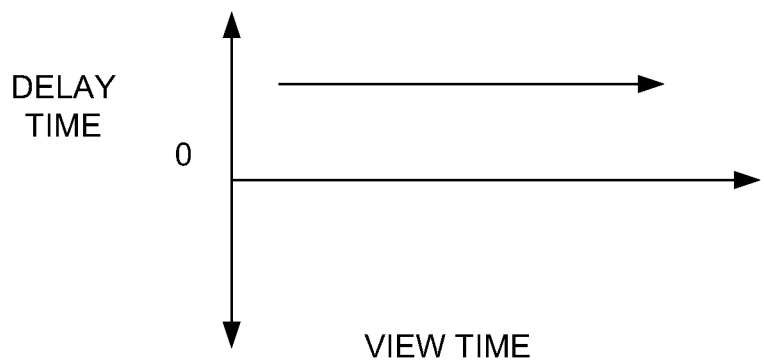
FIG. 10 is a graph that depicts an example of delayed viewing of video program via a DVR.

FIG. 9 is a graph that depicts an example of live viewing of a video program via the DVR 304. As shown in FIG. 9, the delay time equals zero for all view times during live viewing of a program. FIG. 10 is a graph that depicts an example of delayed viewing of video program via the DVR 304. As shown in FIG. 10, the delay time is constant for all view times, indicating that a part of or the entire video program currently being viewed was previously recorded by the DVR 304 and is now being viewed.

Figure 11:
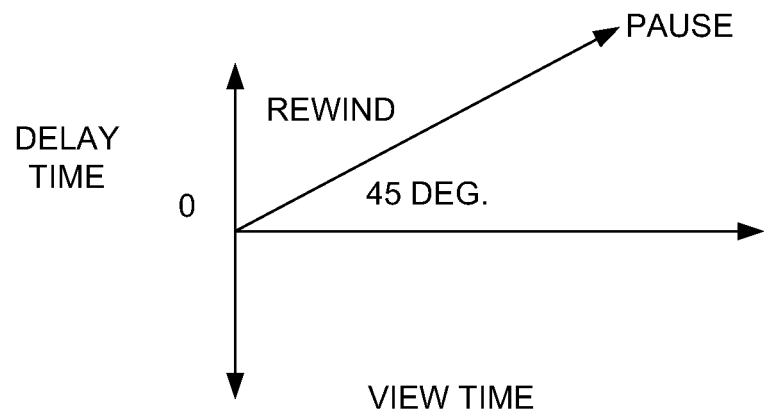
FIG. 11 is a graph that depicts an example relationship between view time and delay time for the paused and rewind operations of a DVR.

FIG. 11 is a graph that depicts an example relationship between view time and delay time for pause and rewind operations of the DVR 304. A pause results in a one-for-one increase in delay time and view time and, thus, the line having a slope equal to one (i.e., at forty-five degrees) represents a paused condition of the DVR 304. On the other hand, if the relationship between view time and delay time falls between the forty-five degree pause line and the vertical axis at ninety degrees, a rewind operation of the DVR 304 is indicated.

Figure 12:
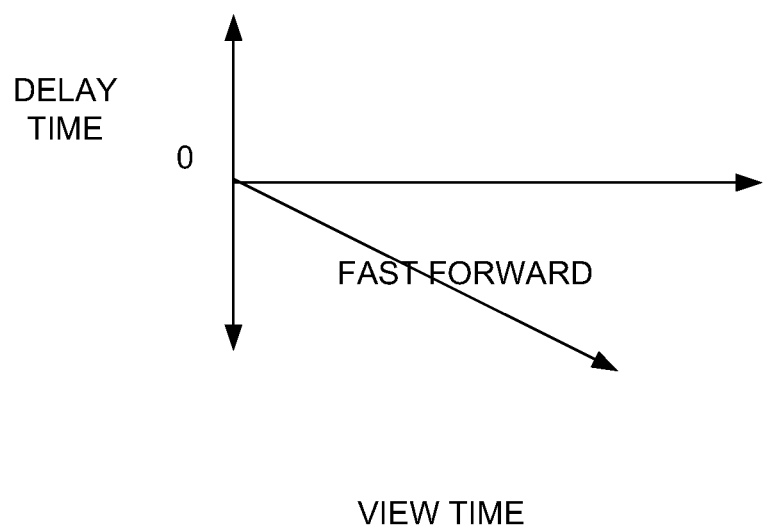
FIG. 12 is a graph that depicts an example relationship between view time and delay time for a fast forward operation of a DVR.

FIG. 12 is a graph that depicts an example relationship between view time and delay time for a fast forward operation of the DVR 304. During fast forward operation of the DVR 304, the delay time decreases as the view time increases. Thus, as shown in FIG. 12, if the relationship between view time and delay time falls between the positive portion of the horizontal axis and the negative portion of the vertical axis (i.e., at minus ninety degrees), a fast forward operation of the DVR 304 is indicated.

Figure 13:
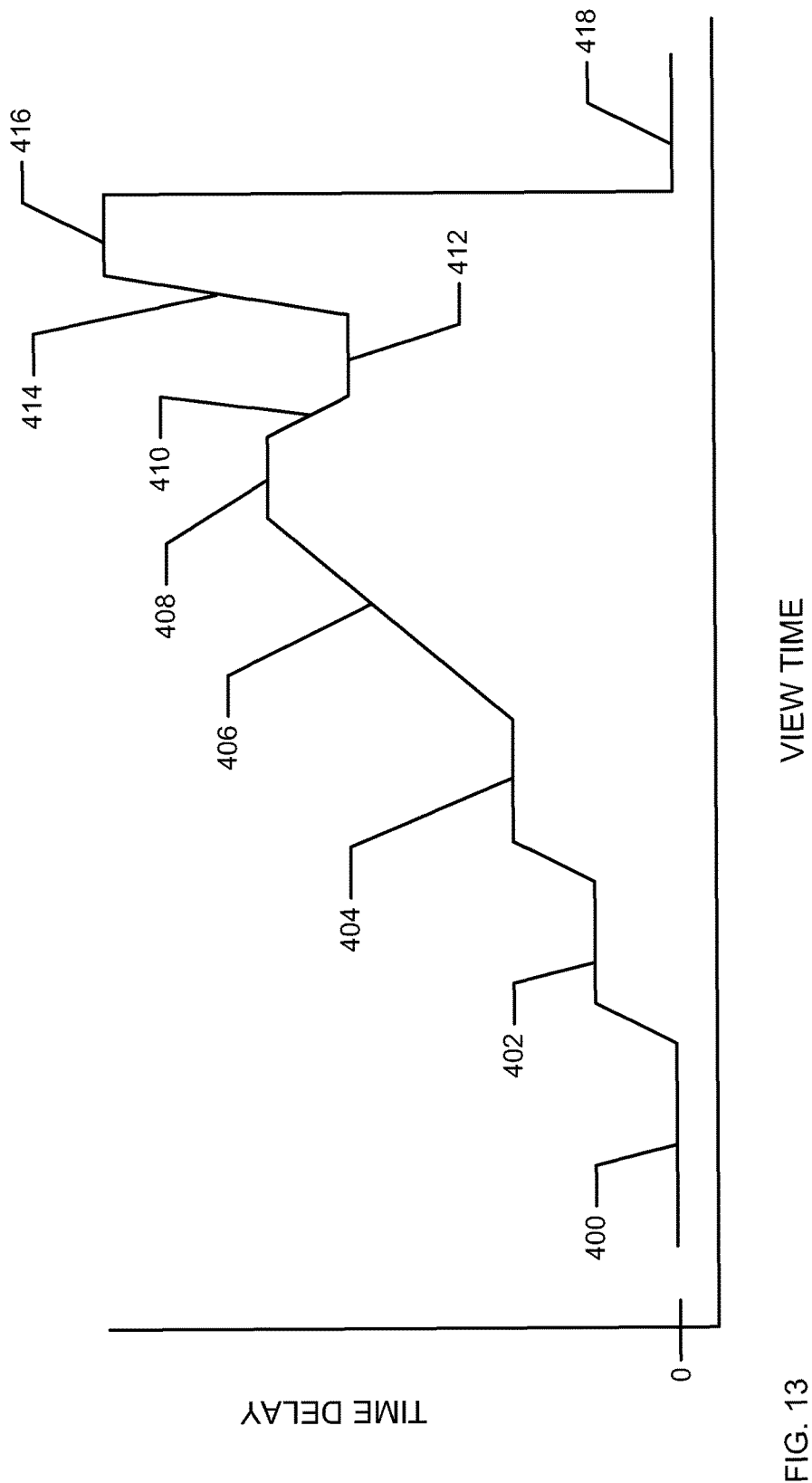
FIG. 13 is a graph of example viewing behavior associated with a DVR.

FIG. 13 is a graph of an example viewing behavior associated with the DVR 304. The example graph shown in FIG. 13 may be generated based on a sequence of events record by the digital information monitor/analyzer 302 and/or by the home unit 306. Alternatively, the example viewing behavior information graphically depicted in FIG. 13 could instead be generated by a central data processing facility in communication with the home unit 306. In any case, the viewing behavior associated with the DVR 304 can be interpreted in light of the general operational characteristics of the DVR 304 shown in FIGS. 9-12.

In a first region 400 of the example of FIG. 13, the delay time equals zero for all view times and, thus, indicates that live viewing of a viewer interface menu or a video program is occurring. In second and third regions 402 and 404, a time shift occurs, indicating that a "go back" command or the like may have been issued by the viewer (via a hand-held remote control or the like) to the DVR 304, causing the DVR to rewind and then resume delayed playback of a video program. In a fourth region 406, the slope equals one, indicating that the DVR 304 is paused. In a fifth region 408, the DVR 304 resumes delayed playback of the video program. In a sixth region 410, the slope of the characteristic is negative, indicating that a fast forward operation is in progress. In a seventh region 412, the DVR 304 resumes delayed playback. In an eighth region 414, the slope of the characteristic is greater than one (i.e., greater than forty-five degrees), indicating that the DVR 304 is engaged in a rewind operation. In a ninth region, 416, the DVR resumes delayed playback. In a tenth region 418, the time delay is again zero for all view times and, thus, the DVR 304 is operating to provide live viewing of a video program.

With the DVR 304 shown in FIG. 8, it may not be possible in some circumstances to distinguish live viewing of a program from paused operation of the DVR 304 by only monitoring information transmitted on the data bus 312. Specifically, when a program is viewed live (i.e., without any delay), information may in some cases only be written (i.e., there are no read operations) to the disk drive 310. Similarly, when a program is initially paused, information may, in some cases, only be written to the disk drive 310. Further, during paused operation, the last viewed video frame does not have to be read from the disk drive 310 because a refresh circuit (not shown) within the DVR 310 is used to constantly regenerate the last frame and provide it to the television 318. Consequently, in some circumstances live viewing and paused operation will appear to be identical based on the information monitored on the data bus 312.

Figure 14:
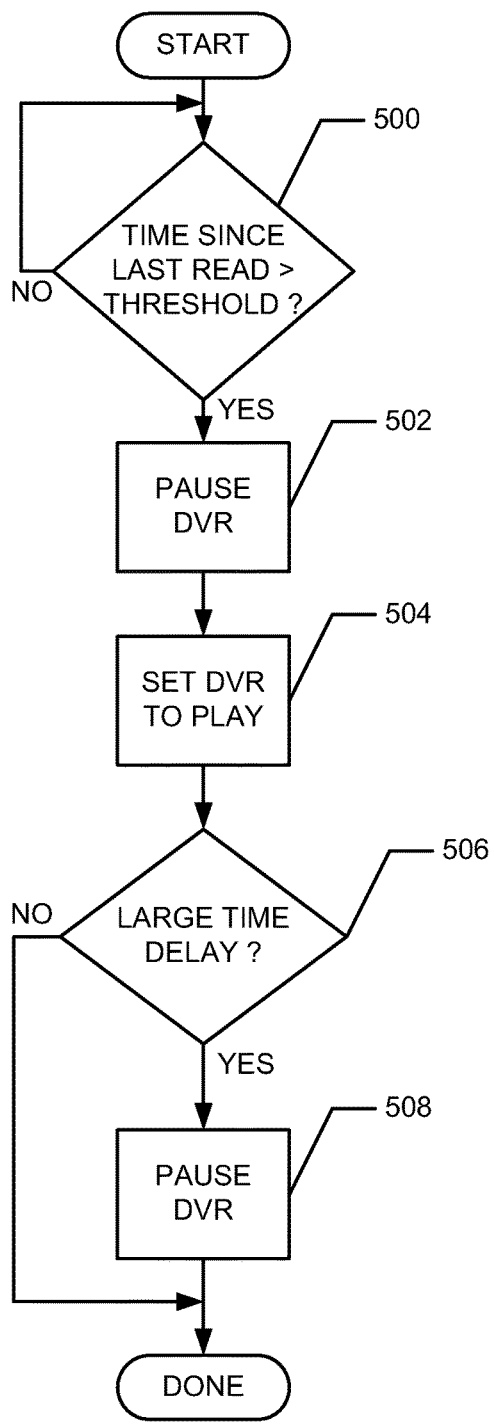
FIG. 14 is a flow diagram of an example method that can be used by the digital information monitor/analyzer devices shown in FIGS. 1, 2 and 3 to enable discrimination between initially paused operation and live viewing operation of a DVR.

FIG. 14 is a flow diagram of an example program that can be used by the digital information monitor/analyzer 14 described herein to eliminate the possibility that paused operation and live viewing operation of a DVR cannot be distinguished. As shown in FIG. 14, the digital information monitor/analyzer 14, for example, determines if the elapsed time since a last read of the disk drive 310 is greater than a predetermined threshold time (e.g., several seconds) (block 500). If the elapsed time is not greater than the predetermined threshold time (block 500), the digital information monitor/analyzer 14 reenters block 500. Otherwise, if the elapsed time is greater than the predetermined threshold time, the digital information monitor/analyzer 14 causes the DVR 304 to pause for a brief time such as, for example, about one-half of a second (block 502). The digital information monitor/analyzer 14 then causes the DVR 304 to enter playback operation (block 504).

The digital information monitor/analyzer 14 then determines if there has been a time delay (block 506) greater than a second threshold. A time delay exceeding the second threshold (e.g., more than one second), indicates that the viewer initially had the DVR 304 paused. Thus, if a large time delay exists, the digital information monitor/analyzer 14 causes the DVR 304 to enter paused operation (block 508). On the other hand, if the digital information monitor/analyzer 14 determines that the time delay (block 506), if any, does not exceed the second threshold, then the DVR 304 is allowed to remain in a playback operating mode. The various DVR commands required to carry out the example method shown in FIG. 14 can be transmitted to the DVR 304 by the digital information monitor/analyzer 14 via the infrared transmitter 322 and the infrared detector 314.

Although certain methods and apparatus have been described herein, the scope of coverage of this patent is not limited thereto. To the contrary, this patent covers all embodiments fairly falling within the scope of the appended claims either literally or under the doctrine of equivalents.

What is claimed is:

1. A method for identifying viewing information associated with a digital media device, the method comprising:
   monitoring, with a logic circuit, a data bus communicatively coupled to a processor and to a data storage device of the digital media device;
   identifying, with the logic circuit, a write command from the processor on the data bus, the write command to cause data to be written to the data storage device;
   identifying, with the logic circuit, a read command from the processor on the data bus, the read command to cause data to be read from the data storage device;
   comparing, with the logic circuit, a memory location associated with the write command to a memory location associated with the read command;
   when the memory locations of the write and read commands are the same memory location, storing, in a memory, an event record including a first timestamp corresponding to the write command and a second timestamp corresponding to the read command; and
   sending, via a communications interface, the event record to an electronic device to determine at least one of an occurrence of live viewing or an occurrence of a playback of recorded media from the data storage device based on a time delay between the first timestamp corresponding to the write command and the second timestamp corresponding to the read command.

2. The method as defined in claim 1, wherein monitoring the data bus includes monitoring for a data packet having a characteristic.

3. The method as defined in claim 1, wherein monitoring the data bus includes monitoring for a data packet size.

4. The method as defined in claim 1, further including generating a sequence of events record based on the write and read commands.

5. The method as defined in claim 1, further including identifying based on the monitoring of the data bus at least one of channel information, operational mode information, or recording information.

6. The method as defined in claim 5, wherein the channel information includes at least one of a channel tuned to by the digital media device or a tuning source associated with the channel.

7. The method as defined in claim 5, wherein the operational mode information includes a time-shift speed associated with the digital media device corresponding to at least one of a play mode, a pause mode, a fast forward mode, or a rewind mode.

8. The method as defined in claim 5, wherein the recording information includes at least one of a recording habit, a recording time, or a recording source.

9. The method as defined in claim 1, wherein the data bus operates in accordance with an integrated drive electronics standard.

10. The method as defined in claim 1, wherein the data storage device includes at least one of a magnetic storage medium, a solid state storage medium, or an optical storage medium.

11. The method as defined in claim 1, wherein the digital media device includes a video recording device.

12. The method as defined in claim 1, further including transmitting viewing information to a data collection facility, the viewing information indicative of at least one of the occurrence of the live viewing or the occurrence of the playback of recorded media.

13. The method as defined in claim 1, further including storing at least one of a quantity of persons or identities of persons involved in at least one of the occurrence of live viewing or the occurrence of the playback of the recorded media.

14. The method as defined claim 1, further including:
   determining that a first data size corresponding to the write command satisfies a data size threshold; and
   ignoring a second write command having a second data size which does not satisfy the data size threshold.

15. An apparatus for identifying viewing information associated with a digital media device, the apparatus comprising:
- a monitor to monitor a data bus communicatively coupled to a processor and to a data storage device of the digital media device;
- a detector communicatively coupled to the monitor to detect, a write command from the processor on the data bus, the write command to cause data to be written to the data storage device, and a read command from the processor on the data bus, the read command to cause data to be read from the data storage device;
- a comparator to compare a memory location associated with the write command to a memory location associated with the read command;
- an event record generator to store, in a memory, an event record including a first timestamp corresponding to the write command and a second timestamp corresponding to the read command when the memory locations of the write and read commands are the same memory location; and
- a communications interface to send the event record to an electronic device to determine at least one of an occurrence of live viewing or an occurrence of a playback of recorded media from the data storage device based on a time delay between the first timestamp corresponding to the write command and the second timestamp corresponding to the read command.

16. The apparatus as defined in claim 15, wherein the monitor is to monitor for a data packet having a characteristic.

17. The apparatus as defined in claim 15, wherein the monitor is to monitor for a data packet size.

18. The apparatus as defined in claim 15, wherein the event record generator is to generate a sequence of events record based on the write and read commands.

19. The apparatus as defined in claim 15, wherein the event record generator is to identify, based on the monitoring of the data bus, at least one of channel information, operational mode information, or recording information.

20. The apparatus as defined in claim 19, wherein the channel information includes at least one of a channel tuned to by the digital media device or a tuning source associated with the channel.

21. The apparatus as defined in claim 19, wherein the operational mode information includes a time-shift speed associated with the digital media device corresponding to at least one of a play mode, a pause mode, a fast forward mode, or a rewind mode.

22. The apparatus as defined in claim 19, wherein the recording information includes at least one of a recording habit, a recording time, or a recording source.

23. The apparatus as defined in claim 15, wherein the data storage device includes at least one of a magnetic storage medium, a solid state storage medium, or an optical storage medium.

24. The apparatus as defined in claim 15, wherein the digital media device includes a video recording device.

25. The apparatus as defined in claim 15, wherein the communication interface is to transmit viewing information to a data collection facility, the viewing information indicative of at least one of the occurrence of live viewing or the occurrence of the playback of recorded media.

26. The apparatus as defined in claim 15, wherein the monitor is to store at least one of a quantity of persons or identities of persons involved in at least one of the occurrence of live viewing or the occurrence of the playback of the recorded media.

27. A computer-readable storage device or storage disk comprising machine-readable instructions, which, when executed, cause a machine to at least:
- identify, a write command on a data bus communicatively coupled to a processor and to a data storage device of a digital media device, the write command to cause data to be written to the data storage device;
- identify a read command from the processor on the data bus, the read command to cause data to be read from the data storage device;
- compare a memory location associated with the write command to a memory location associated with the read command;
- when the memory locations of the write and read commands are the same memory location, store, in a memory, an event record including a first timestamp corresponding to the write command and a second timestamp corresponding to the read command; and
- send the event record to an electronic device to determine at least one of an occurrence of live viewing or an occurrence of a playback of recorded media from the data storage device based on a time delay between the first timestamp corresponding to the write command and the second timestamp corresponding to the read command.

28. The computer-readable storage device or storage disk as defined in claim 27, wherein the machine-readable instructions, when executed, cause the machine to monitor the data bus by monitoring for a data packet having a characteristic.

29. The computer-readable storage device or storage disk as defined in claim 27, wherein the machine-readable instructions, when executed, cause the machine to monitor the data bus by monitoring for a data packet size.

30. The computer-readable storage device or storage disk as defined in claim 27, wherein the machine-readable instructions, when executed, cause the machine to generate a sequence of events record based on the write and read commands.

31. The computer-readable storage device or storage disk as defined in claim 27, wherein the machine-readable instructions, when executed, cause the machine to identify at least one of channel information, operational mode information, or recording information based on the monitoring of the data bus.

32. An apparatus for identifying viewing information associated with a digital media device comprising:
- means for monitoring a data bus communicatively coupled to a processor and to a data storage device of the digital media device;
- means for identifying, a write command from the processor on the data bus, the write command to cause data to be written to the data storage device, and a read command from the processor on the data bus, the read command to cause data to be read from the data storage device;
- means for comparing a memory location associated with the write command to a memory location associated with the read command;
- means for storing, in a memory, an event record including a first timestamp corresponding to the write command and a second timestamp corresponding to the read command when the memory locations of the write and read commands are the same memory location; and means for sending the event record to an electronic device to determine at least one of an occurrence of live viewing or an occurrence of a playback of recorded media from the data storage device based on a time delay between the first timestamp corresponding to the write command and the second timestamp corresponding to the read command.

33. The apparatus as defined in claim 32, wherein the means for monitoring the data bus monitors for a data packet having a characteristic.

34. The apparatus as defined in claim 32, wherein the means for monitoring the data bus monitors for a data packet having a data packet size.

35. The apparatus as defined in claim 32, further including means for generating a sequence of events record from the write and read commands.

36. The apparatus as defined in claim 32, wherein the means for identifying identifies at least one of channel information, operational mode information, or recording information from the write and read commands.

* * * * *